(12) United States Patent
Oliver et al.

(10) Patent No.: US 10,423,643 B2
(45) Date of Patent: Sep. 24, 2019

(54) SYSTEM AND METHOD FOR SUPPORTING RESETTABLE ACKNOWLEDGEMENTS FOR SYNCHRONIZING DATA IN A DISTRIBUTED DATA GRID

(71) Applicant: Oracle International Corporation, Redwood Shores, CA (US)

(72) Inventors: Brian K. Oliver, Acton, MA (US); Patrick Peralta, Arlington, MA (US); Paul F. Mackin, Manchester, NH (US); Noah Arliss, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 290 days.

(21) Appl. No.: 14/467,315

(22) Filed: Aug. 25, 2014

(65) Prior Publication Data
US 2015/0066843 A1    Mar. 5, 2015

Related U.S. Application Data

(60) Provisional application No. 61/871,708, filed on Aug. 29, 2013.

(51) Int. Cl.
*G06F 17/30* (2006.01)
*G06F 16/27* (2019.01)
(Continued)

(52) U.S. Cl.
CPC ........ *G06F 16/275* (2019.01); *G06F 11/1464* (2013.01); *G06F 11/2033* (2013.01);
(Continued)

(58) Field of Classification Search
CPC ......... G06F 17/30575; G06F 17/30286; G06F 17/30067; G06F 17/30008; G06F 11/2094;
(Continued)

(56) References Cited

U.S. PATENT DOCUMENTS

| | | | |
|---|---|---|---|
| 7,296,191 B2 * | 11/2007 | Bae ........................... | H04L 1/22 714/47.3 |
| 7,478,263 B1 | 1/2009 | Kownacki | |

(Continued)

FOREIGN PATENT DOCUMENTS

EP    1591900 A2    11/2005

OTHER PUBLICATIONS

European Patent Office, International Searching Authority, International Search Report and Written Opinion dated Dec. 2, 2014 for International Application No. PCT/US2014/052733, 9 pages.
(Continued)

*Primary Examiner* — Shahid A Alam
*Assistant Examiner* — Andalib F Lodhi
(74) *Attorney, Agent, or Firm* — Tucker Ellis LLP

(57) ABSTRACT

A system and method can support resettable acknowledgements for synchronizing data between clusters in a distributed data grid. The system can use one or more unique identifiers (IDs) to support message passing between different clusters in the distributed data grid. A first cluster can receive a first replication message from a second cluster, wherein the replication message indicates that the replication message is from a new cluster. Then, the system can reset the first cluster to preserve idempotence in possessing one or more replication messages that are received from the second cluster, following the first replication message.

20 Claims, 20 Drawing Sheets

(51) Int. Cl.
*G06F 11/14* (2006.01)
*H04L 29/08* (2006.01)
*G06F 12/02* (2006.01)
*G06F 12/0871* (2016.01)
*G06F 11/20* (2006.01)

(52) U.S. Cl.
CPC ...... *G06F 11/2094* (2013.01); *G06F 11/2097* (2013.01); *G06F 12/02* (2013.01); *G06F 12/0871* (2013.01); *G06F 16/27* (2019.01); *H04L 67/1095* (2013.01); *H04L 67/1097* (2013.01); *H04L 67/2842* (2013.01); *H04L 67/2852* (2013.01)

(58) Field of Classification Search
CPC ............ G06F 11/2097; G06F 11/2033; G06F 12/0871; G06F 12/02; G06F 17/30581; G06F 11/1464; G06F 16/275; G06F 16/27; H04L 67/2842; H04L 67/1097; H04L 67/2852; H04L 67/1095; H05K 999/99

See application file for complete search history.

(56) References Cited

U.S. PATENT DOCUMENTS

| | | | |
|---|---|---|---|
| 8,296,265 B2* | 10/2012 | Yamagami | G06F 11/1471 707/648 |
| 8,341,115 B1 | 12/2012 | Natanzon | |
| 9,116,862 B1 | 8/2015 | Rath | |
| 2002/0129207 A1 | 9/2002 | Matsumoto et al. | |
| 2002/0133727 A1* | 9/2002 | Dervin | G06F 11/0709 713/310 |
| 2004/0215640 A1 | 10/2004 | Bamford | |
| 2007/0174290 A1* | 7/2007 | Narang | G06F 17/30539 |
| 2008/0270704 A1 | 10/2008 | He et al. | |
| 2009/0182970 A1 | 7/2009 | Battista | |
| 2010/0179874 A1* | 7/2010 | Higgins | G06K 9/00664 705/14.53 |
| 2011/0040617 A1* | 2/2011 | Moonka | G06Q 30/02 705/14.46 |
| 2011/0145497 A1 | 6/2011 | Bish | |
| 2011/0307450 A1 | 12/2011 | Hahn | |
| 2012/0166723 A1 | 6/2012 | Araki et al. | |
| 2012/0303999 A1* | 11/2012 | Calder | G06F 11/1471 714/6.3 |
| 2013/0275612 A1* | 10/2013 | Voss | H04L 65/60 709/231 |
| 2014/0032957 A1 | 1/2014 | Beeston | |
| 2014/0189530 A1* | 7/2014 | Anand | H04L 65/403 715/753 |
| 2015/0023213 A1* | 1/2015 | Soneda | H04W 40/32 370/254 |

OTHER PUBLICATIONS

United States Patent and Trademark Office, Office Action dated Jun. 24, 2016 for U.S. Appl. No. 14/467,311, 16 Pages.

European Patent Office, Examining Division, Communication Pursuant to Article 94(3) EPC, dated Oct. 23, 2017 for European Patent Application No. 14766277.9, 8 Pages.

* cited by examiner

SYSTEM AND METHOD FOR SUPPORTING RESETTABLE ACKNOWLEDGEMENTS FOR SYNCHRONIZING DATA IN A DISTRIBUTED DATA GRID

CLAIM OF PRIORITY

This application claims priority on U.S. Provisional Patent Application No. 61/871,708, entitled "SYSTEM AND METHOD FOR SUPPORTING FEDERATED CACHING IN A DISTRIBUTED DATA GRID" filed Aug. 29, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent application(s), each of which is hereby incorporated by reference in its entirety:

U.S. Patent Application titled "SYSTEM AND METHOD FOR SUPPORTING PARTITION LEVEL JOURNALING FOR SYNCHRONIZING DATA IN A DISTRIBUTED DATA GRID", application Ser. No. 14/467,308, filed Aug. 25, 2014;

U.S. Patent Application titled "SYSTEM AND METHOD FOR SUPPORTING PARALLEL ASYNCHRONOUS SYNCHRONIZATION BETWEEN CLUSTERS IN A DISTRIBUTED DATA GRID", application Ser. No. 14/467,310, filed Aug. 25, 2014; and U.S. Patent Application titled "SYSTEM AND METHOD FOR SUPPORTING FAILOVER DURING SYNCHRONIZATION BETWEEN CLUSTERS IN A DISTRIBUTED DATA GRID", application Ser. No. 14/467,311, filed Aug. 25, 2014.

FIELD OF INVENTION

The present invention is generally related to computer systems, and is particularly related to supporting federated caching in a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support resettable acknowledgements for synchronizing data between clusters in a distributed data grid. The system can use one or more unique identifiers (IDs) to support message passing between different clusters in the distributed data grid. A first cluster can receive a first replication message from a second cluster, wherein the replication message indicates that the replication message is from a new cluster. Then, the system can reset the first cluster to preserve idempotence in possessing one or more replication messages that are received from the second cluster, following the first replication message.

DETAILED DESCRIPTION

Figure 1:
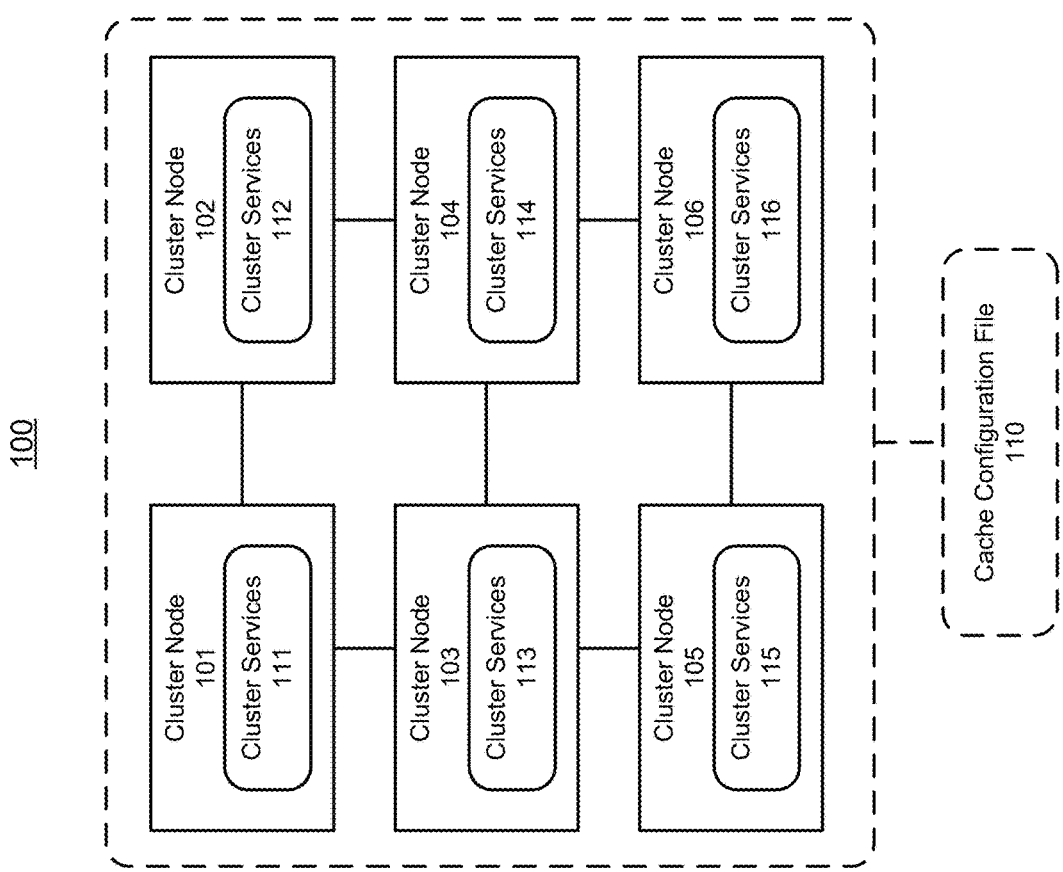
FIG. 1 is an illustration of a data grid cluster in accordance with various embodiments of the invention.

Described herein are systems and methods that can support federated caching in a distributed data grid.

Distribute Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster members (or server nodes) such as cluster nodes 101-106, having various cluster services 111-116 running thereon. Additionally, a cache configuration file 110 can be used to configure the data grid cluster 100.

In accordance with an embodiment, the data grid cluster 100 can support federated data features based on parallel asynchronous push replication technologies. The federated data features enable synchronizing data between data grid clusters (potentially at different physical locations), and are beneficial in supporting disaster recovery, providing 24×7 availability, and reducing latency for regional users.

Partition Level Journaling for Synchronization

Figure 2:
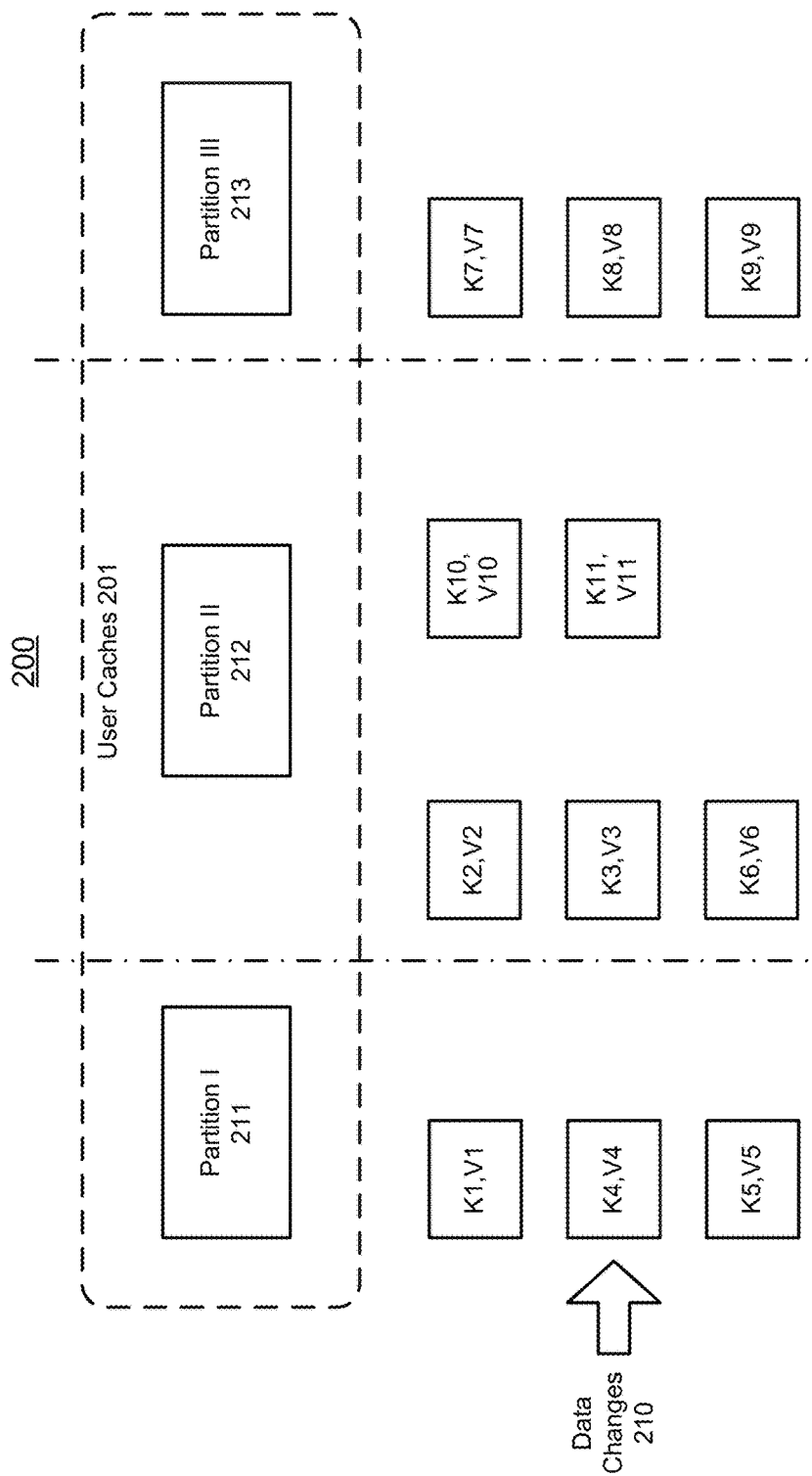
FIG. 2 shows an illustration of capturing data changes in a distributed data grid, in accordance with an embodiment of the invention.

FIG. 2 shows an illustration of capturing data changes in a distributed data grid, in accordance with an embodiment of the invention. As shown in FIG. 2, the distributed data grid 200 can support one or more user caches 201. Additionally, the one or more user caches 201 can be split into a plurality of partitions, e.g. partitions I-III 211-213, which can be evenly distributed throughout the cluster 200.

Furthermore, user data can be assigned to a partition in the distributed data grid 200 based on performing a hash on the cache entry key. Alternatively, user data can be assigned to a partition based on performing a hash on a key associated with the cache entry, which can be defined via an interface implemented by the user. Additionally, user data can be explicitly assigned to a partition in the distributed data grid 200.

In accordance with an embodiment of the invention, a partitioned distributed cluster 200 can capture data changes made to the one or more user caches 201 in the order in which they were made. As shown in FIG. 2, the data changes 210, which are applied on the one or more user caches 201, can be represented in the order from (K1, V1) to (K11, V11). Among these data changes, (K1, V1), (K4, V4), and (K5, V5) relate to partition I 211, (K2, V2), (K3, V3), (K6, V6), (K10, V10), and (K11, V11) relate to partition II 212, (K7, V7), (K7, V7), and (K8, V8) relate to partition III 213.

Figure 3:
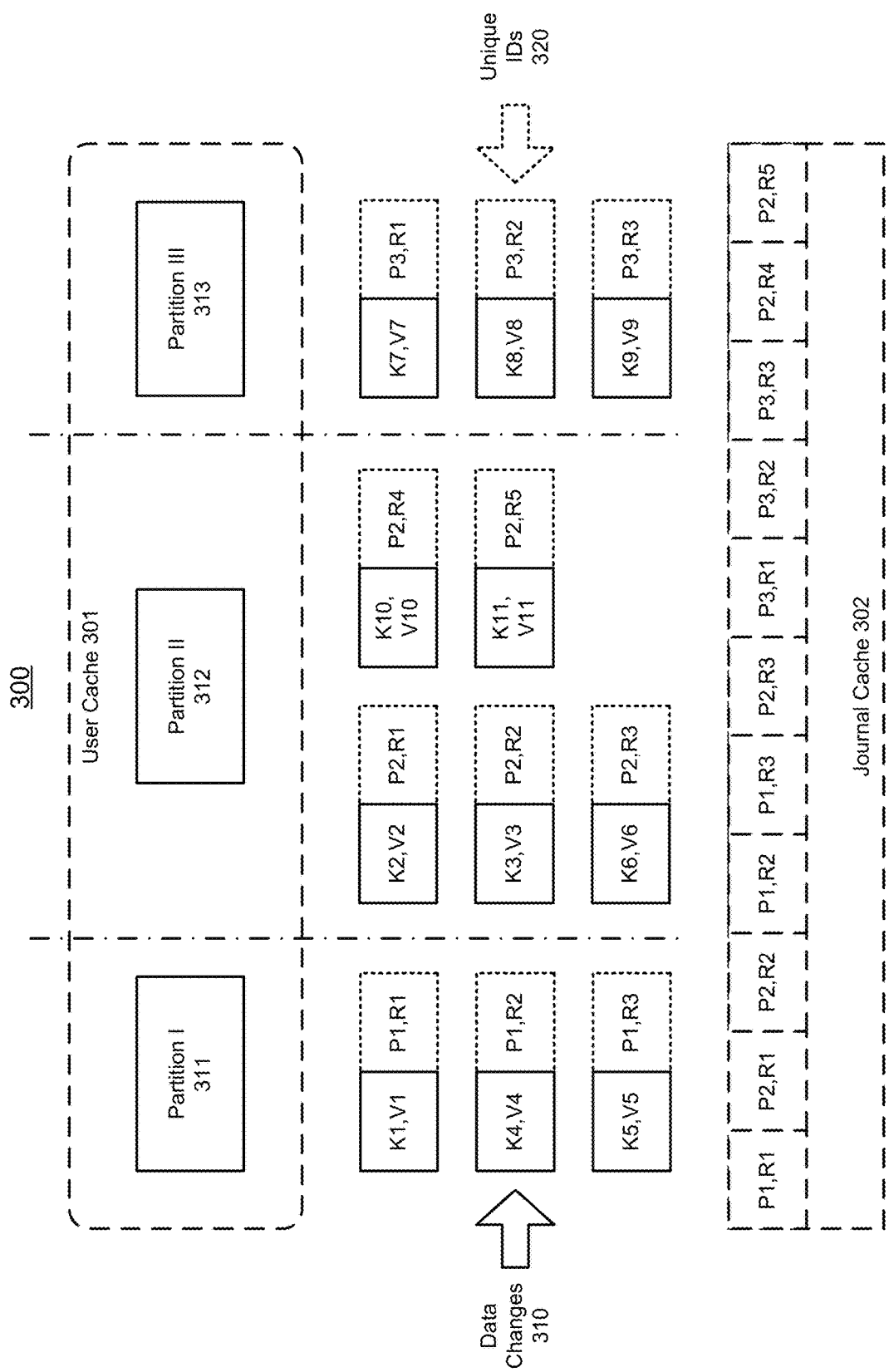
FIG. 3 shows an illustration of supporting partition level journaling for synchronization in a distributed data grid, in accordance with an embodiment of the invention.

FIG. 3 shows an illustration of supporting partition level journaling for synchronization in a distributed data grid, in accordance with an embodiment of the invention. As shown in FIG. 3, the distributed data grid 300 supports one or more user caches 301, which can be split into a plurality of partitions (e.g. partitions I-III 311-313).

The distributed data grid 300 can capture data changes, e.g. (K1, V1) to (K11, V11), which are applied to one or more user caches 301, in the order as they were made.

Additionally, these data changes can be placed in a journal cache 302, which can be used for synchronization with remote clusters.

In accordance with an embodiment of the invention, the system can generate a globally unique identifier (ID) 320 for each data change stored in the journal cache 302. The globally unique IDs 320, which can include multiple parts (e.g. using integers), can identify a source partition, to which the data changes are made, and an order, in which such data changes are made in the source partition (also with regard to the other data changes).

For example, an exemplary globally unique ID 320 can be represented in the format of (Pi, Rj), where Pi indicates the source partition and Rj indicates the order of the particular data change on the source partition.

As shown in FIG. 3, the data changes (K1, V1), (K4, V4), and (K5, V5), which relate to partition I 311, are assigned with the globally unique IDs, (P1, R1), (P1, R2), and (P1, R3) respectively. Similarly, the data changes (K2, V2), (K3, V3), (K6, V6), (K10, V10), and (K11, V11), which relate to partition II 312, are assigned with the globally unique IDs, (P2, R1), (P2, R2), (P2, R3), (P2, R4), and (P2, R5) respectively. Additionally, the data changes (K7, V7), (K8, V8), and (K9, V9), which relate to partition III 313, are assigned with the globally unique IDs, (P3, R1), (P3, R2), and (P3, R3) respectively.

Furthermore, each of the globally unique IDs 320 can be used as a key for an entry in the journal cache 302. Thus, this multiple-part key allows the system to generate unique IDs across the cluster without any input/output (IO) and/or synchronization within the cluster 300.

Figure 4:
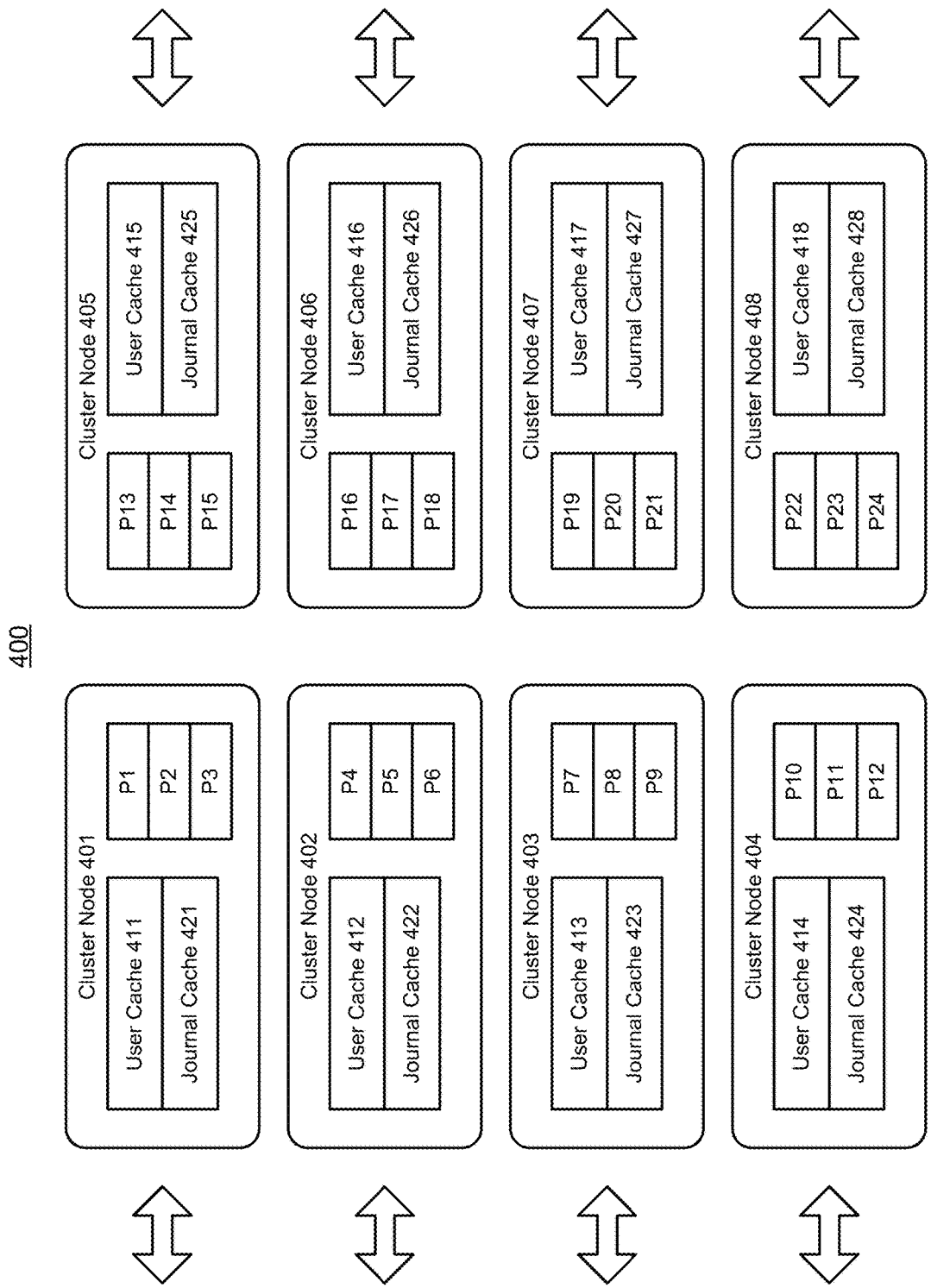
FIG. 4 shows an illustration of supporting a cluster wide view of a journal cache in a distributed data grid, in accordance with an embodiment of the invention.

FIG. 4 shows an illustration of supporting a cluster wide view of a journal cache in a distributed data grid, in accordance with an embodiment of the invention. As shown in FIG. 4, the distributed data grid 400 can include a plurality of cluster members (e.g. the cluster nodes 401-408), Each of the cluster nodes 401-408 can be an owner of one or more partitions. For example, the cluster node 401 is the owner of the partitions P1-P3, the cluster node 402 is the owner of the partitions P4-P6, the cluster node 403 is the owner of the partitions P7-P9, the cluster node 404 is the owner of the partitions P10-P12, the cluster node 405 is the owner of the partitions P13-P15, the cluster node 406 is the owner of the partitions P16-P18, the cluster node 407 is the owner of the partitions P19-P21, and the cluster node 408 is the owner of the partitions P22-P24.

In accordance with an embodiment of the invention, a journal cache can be implemented based on a partitioned cache, e.g. by taking advantage of the partitions that contains the user caches. Furthermore, users can access the journal cache in a fashion similar to accessing the user cache. As shown in FIG. 4, users can access the user cache and the journal cache from any one of the cluster nodes 401-408 (i.e. via the user caches 411-418 and the journal caches 421-428).

Figure 5:
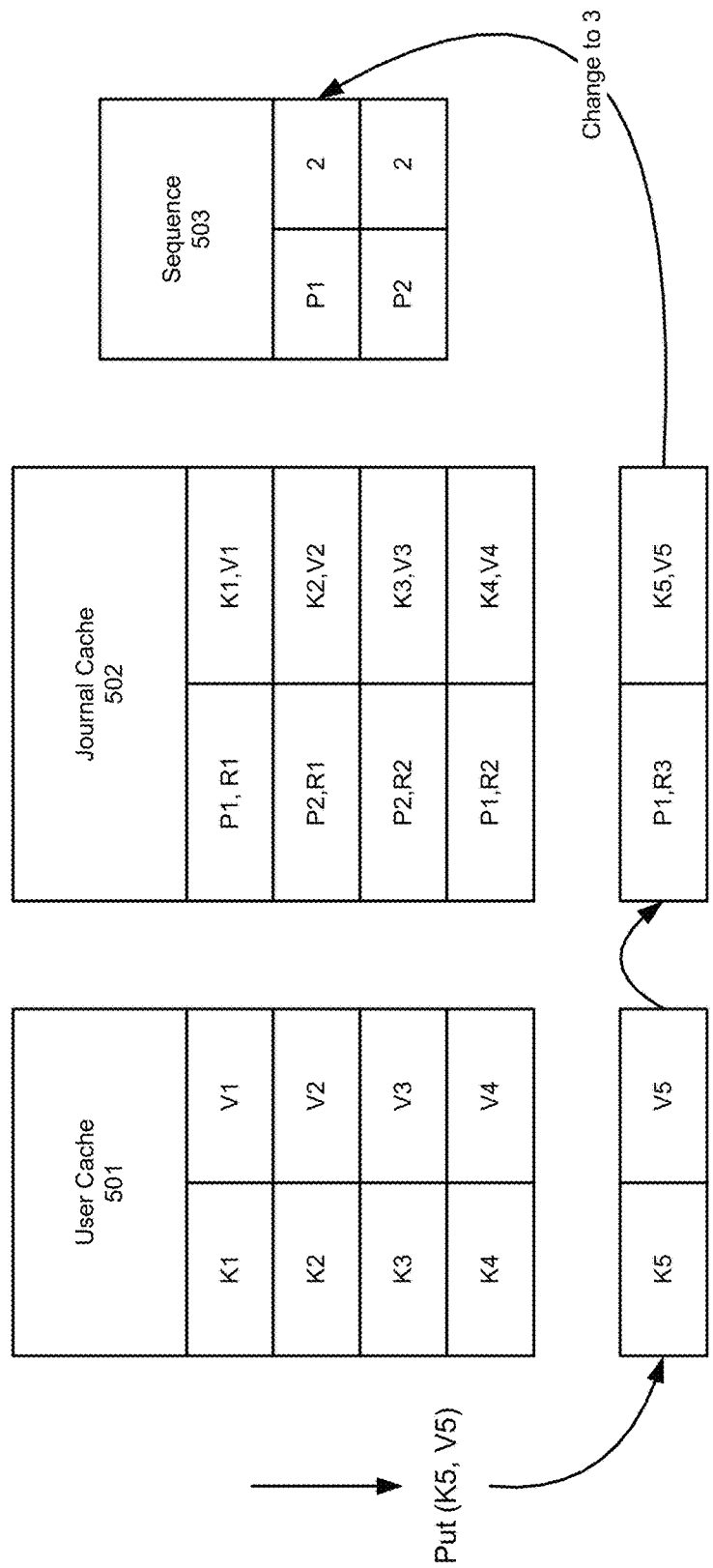
FIG. 5 shows an illustration of performing a single transaction for supporting partition level journaling in a distributed data grid, in accordance with an embodiment of the invention.

FIG. 5 shows an illustration of performing a single transaction for supporting partition level journaling in a distributed data grid, in accordance with an embodiment of the invention. As shown in FIG. 5, the distributed data grid 500 can include a user cache 501 and a journal cache 502.

In accordance with an embodiment of the invention, the distributed data grid 500 can capture data changes made to the user cache 501 and place these data changes in the journal cache 502 that can be used for synchronization with remote clusters.

For example, the user cache 501 may have already made several data changes, such as (K1, V1), (K2, V2), (K3, V3), and (K4, V4). These captured data changes can be stored in the journal cache 502 using the global unique IDs (P1, R1), (P2, R1), (P2, R2), and (P1, R2) respectively. These global unique IDs indicate that (K1, V1) is the first data change applied on partition P1, (K2, V2) is the first data change applied on partition P2, (K3, V3) is the second data change applied on partition P2, and (K4, V4) is the second data change applied on partition P2.

Additionally, the system can take advantage of a sequence table 503, which maintains the total number of data changes for the different partitions. As shown in FIG. 5, the sequence table 503 indicates that both the partitions P1 and P2 have made two data changes.

In accordance with an embodiment of the invention, the distributed data grid 500 can use the sequence table 503 to quickly generate a unique ID for a newly captured data change on any of the partitions.

As shown in FIG. 5, a user can make a data change, e.g. "put (K5, V5)," which applies on partition P1 in the user cache 501. The system can capture this data change and quickly generate a unique ID, (P1, R3) for the last data change, since the data change is the third data change applied on partition P1.

Furthermore, after the distributed data grid 500 stores this data change in the journal cache 502, the sequence table 503 can be updated to indicate that partition P1 has made three data changes.

Figure 6:
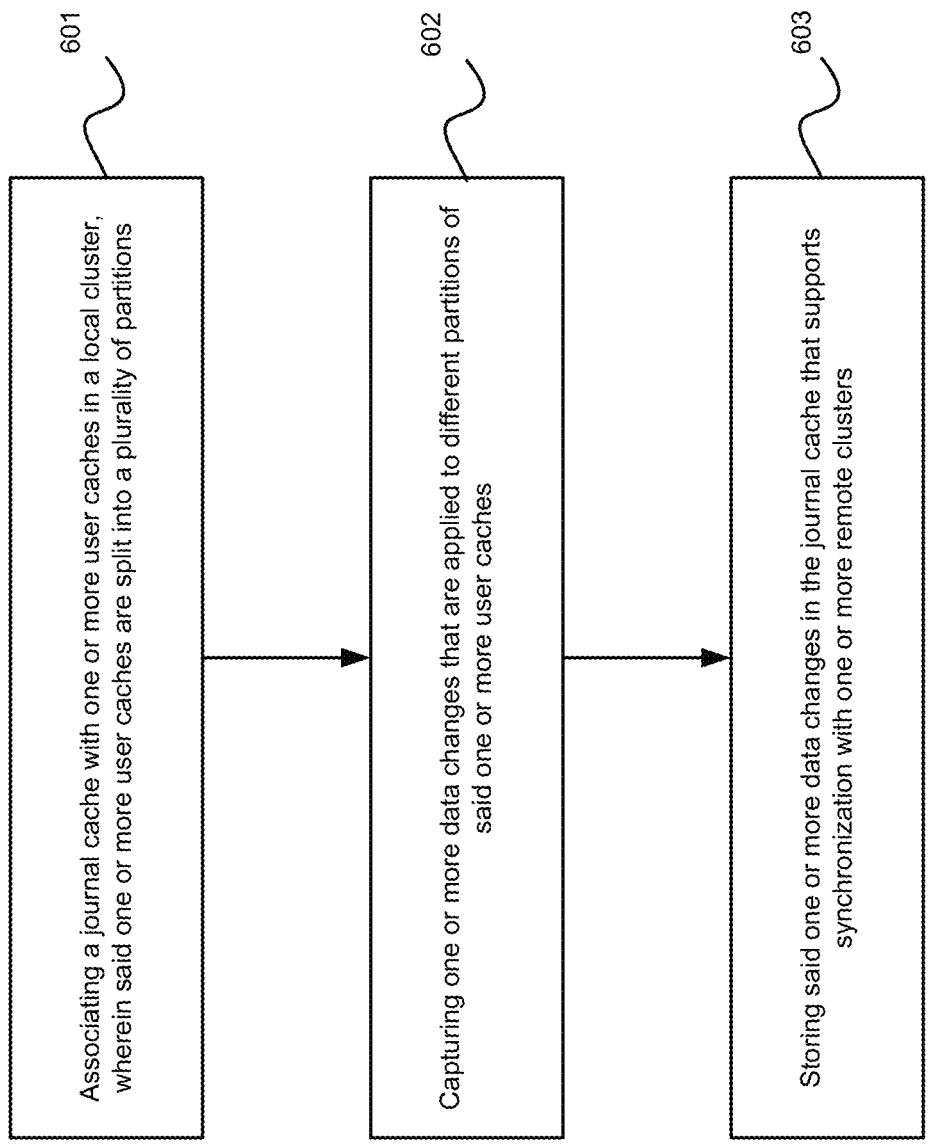
FIG. 6 illustrates an exemplary flow chart for supporting partition level journaling for synchronization in a distributed data grid, in accordance with an embodiment of the invention.

FIG. 6 illustrates an exemplary flow chart for supporting partition level journaling for synchronization in a distributed data grid, in accordance with an embodiment of the invention. As shown in FIG. 6, at step 601, the system can associate a journal cache with one or more user caches in a local cluster, wherein said one or more user caches are split into a plurality of partitions. Then, at step 602, the system can capture one or more data that are applied to different partitions of said one or more user caches. Furthermore, at step 603, the system can store said one or more data changes in the journal cache that supports synchronization with one or more remote clusters.

Parallel Asynchronous Synchronization between Autonomous Clusters

Figure 7:
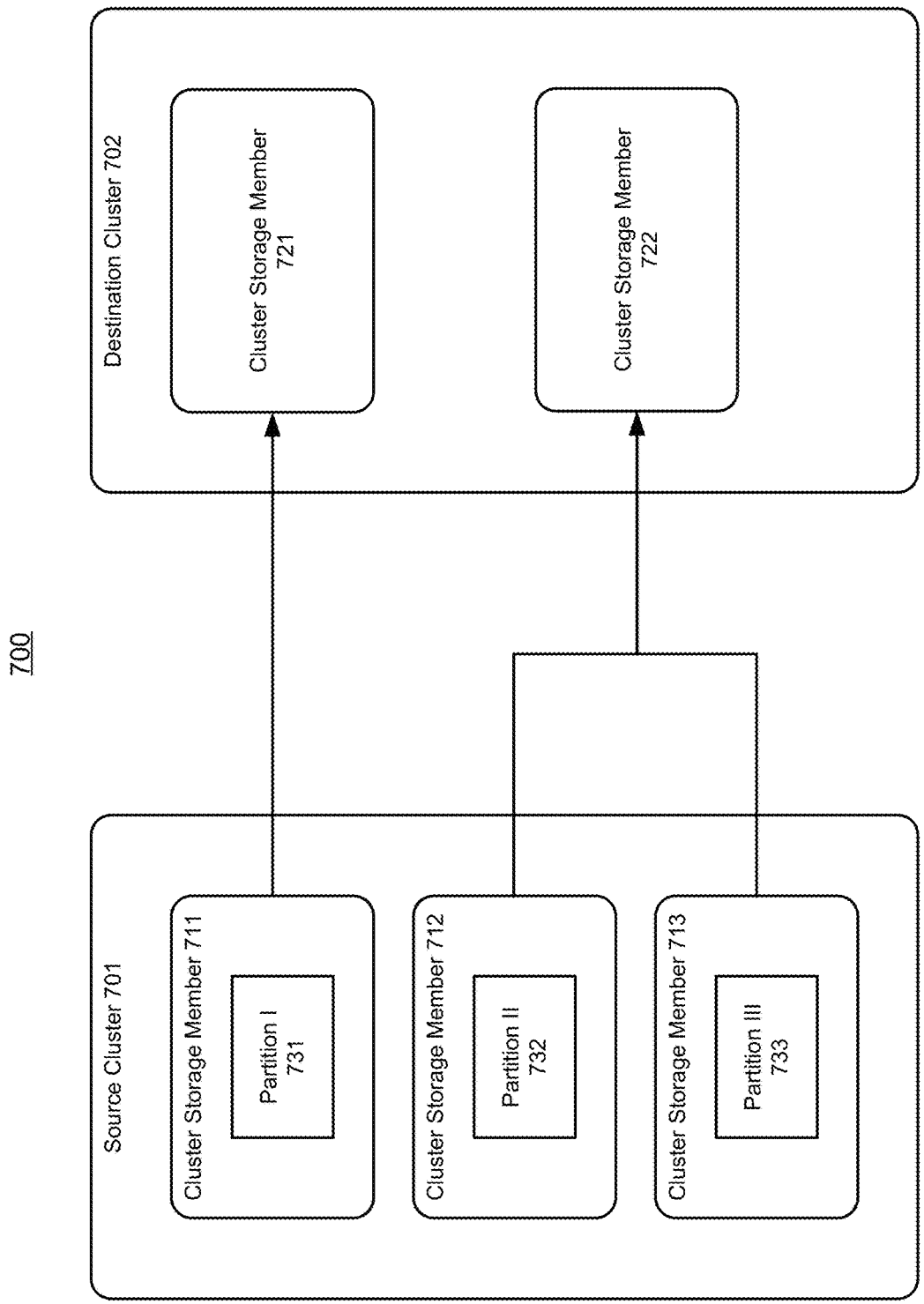
FIG. 7 shows an illustration of supporting parallel asynchronous synchronization between autonomous clusters in a distributed data grid, in accordance with an embodiment of the invention.

FIG. 7 shows an illustration of supporting parallel asynchronous synchronization between autonomous clusters in a distributed data grid, in accordance with an embodiment of the invention. As shown in FIG. 7, the distributed data grid 700 can synchronize data changes between autonomous clusters, such as from a source cluster 701 to a destination cluster 702. Furthermore, the system can track the data changes, which are applied to various user caches in the partitioned source cluster 701, at a partition level.

In accordance with an embodiment of the invention, different cluster members in the source cluster 701 can work in parallel to synchronize data changes on different partitions to the cluster members in one or more destination clusters, e.g. a destination cluster 702.

At the cluster level, multiple cluster members in the source cluster 701 can synchronize data changes to multiple cluster members in the destination cluster 702 in parallel (i.e. a many-to-many relationship). At the partition level, the synchronization of the data changes always involves a source and a destination (i.e. a one-to-one relationship).

In accordance with an embodiment of the invention, the cluster members in the source cluster 701 and the cluster members in the destination cluster 702 can be cluster storage members, which are the owners of the different partitions.

Alternatively, the cluster members can be other cluster nodes, which are associated with the owners of the different partitions.

As shown in FIG. 7, the cluster storage member 711, which is the owner of the partition I 731, can process the journal entries for the partition I 731 and sends the information to the cluster storage member 721 in the destination cluster 702. Additionally, the cluster storage member 712, which is the owner of the partition II 732, can process the journal entries for a partition II 732, and the cluster storage member 713, which is the owner of the partition III 733, can process the journal entries for a partition III 733. Both the cluster storage member 712 and the cluster storage member 713 can send the synchronization information to the cluster storage member 722 in the destination cluster 702.

In accordance with an embodiment of the invention, the synchronization process can be asynchronous from the prospective of different entities involved. These entities may include the client, which generates the data changes that are captured in the journal, the source cluster 701, which sends data changes to the destination cluster 702, and the destination cluster 702, which sends acknowledgements indicating receipt and successful processing of the data changes.

Figure 8:
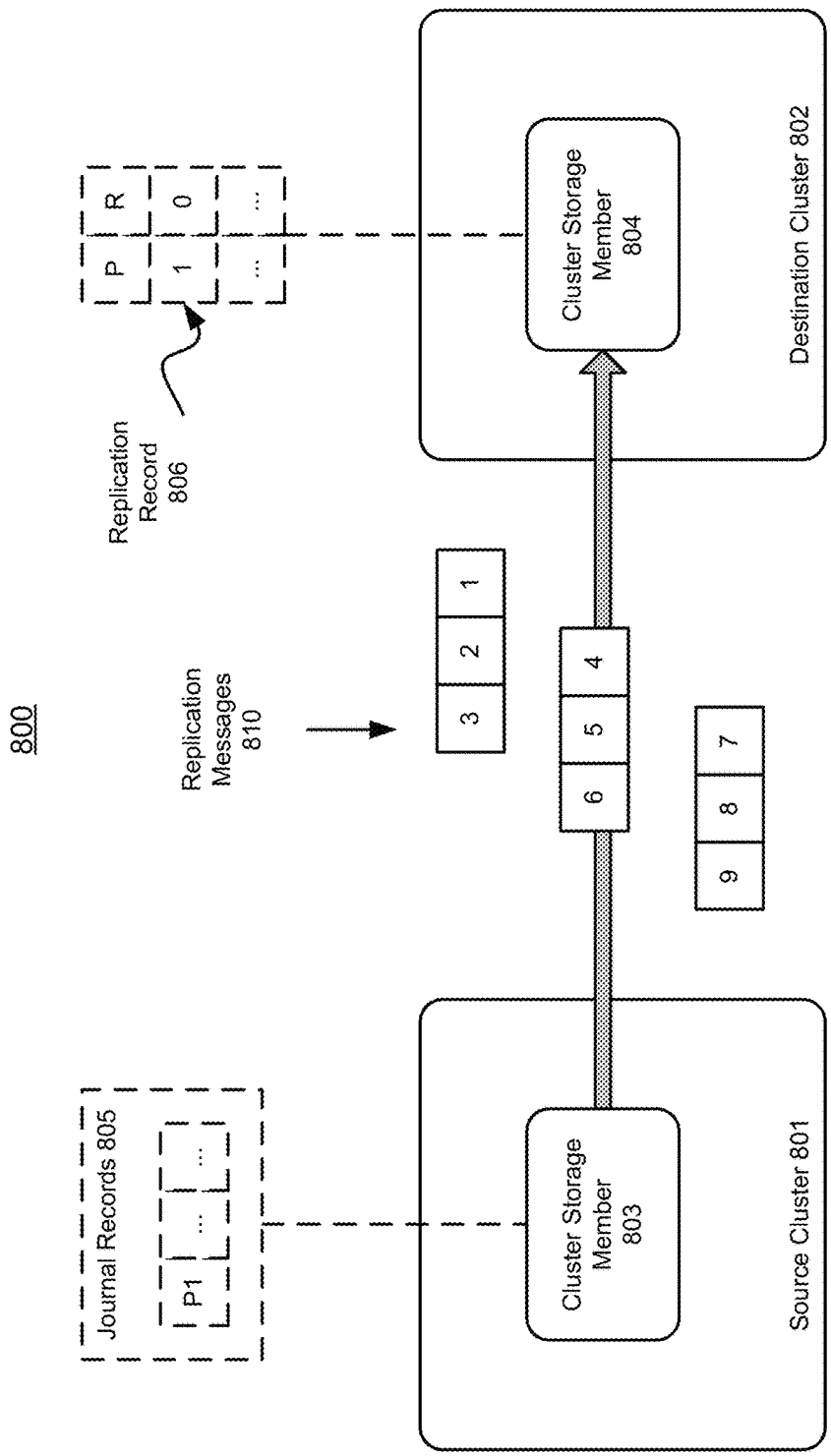
FIG. 8 shows an illustration of initiating asynchronous synchronization between autonomous clusters in a distributed data grid, in accordance with an embodiment of the invention.

FIG. 8 shows an illustration of initiating asynchronous synchronization between autonomous clusters in a distributed data grid, in accordance with an embodiment of the invention. As shown in FIG. 8, a cluster storage member 803, which owns the partition P1 in a source cluster 801 in a distributed data grid 800, can process the journal entries for the partition P1 in the journal record 805, and can send one or more replication messages 810 to a cluster storage member 804 in a destination cluster 802. For example, the replication messages 810 can include the data changes (1-3), (4-6), and (7-9) that are made to the partition P1 in the source cluster 801.

In accordance with an embodiment of the invention, the system can use unique IDs for passing replication messages 810 between the source cluster 801 and the destination cluster 802 in the distributed data grid 800. For example, the unique IDs may be monotonically incremented in the order as the corresponding data changes are made to a particular partition in the source cluster 801 (e.g. partition P1). Thus, the system can guarantee that the synchronization operations are idempotent.

Additionally, the destination cluster 802 can keep a record 806, which indicates the last data change that has been received and successfully processed for each partition in the destination cluster 802.

As shown in FIG. 8, the record 806, which has an entry "0" for partition "1", indicates that the cluster storage node 804 in the destination cluster 804 has not received and successful processed any data change for partition P1. Additionally, the record 806 can maintain more entries for storing information on other partitions.

Figure 9:
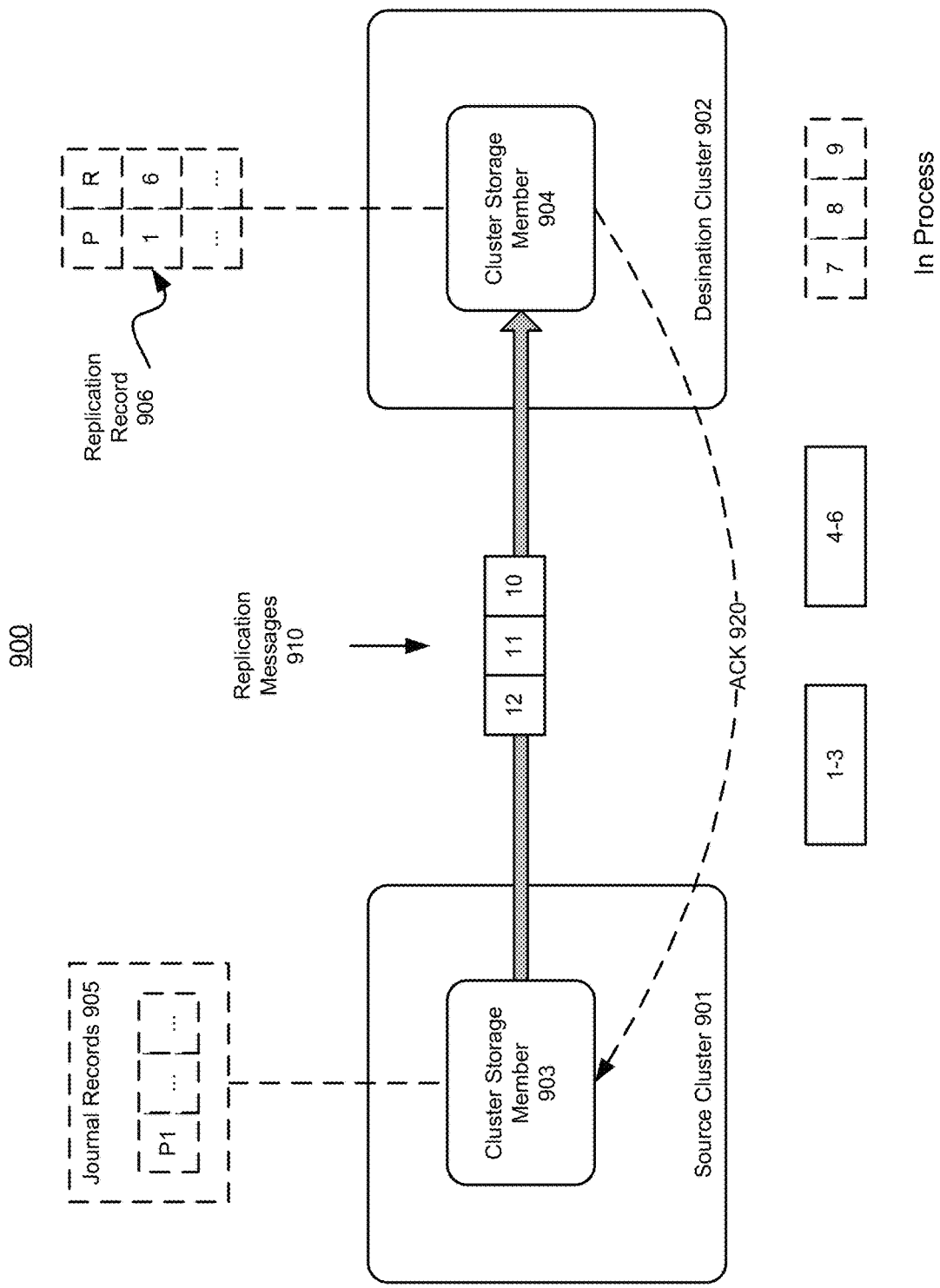
FIG. 9 shows an illustration of performing asynchronous synchronization between autonomous clusters in a distributed data grid, in accordance with an embodiment of the invention.

FIG. 9 shows an illustration of performing asynchronous synchronization between autonomous clusters in a distributed data grid, in accordance with an embodiment of the invention. As shown in FIG. 9, a cluster storage member 903, which owns the partition P1 in a source cluster 901 in a distributed data grid 900, can process the journal entries for the partition P1 in the journal record 905, and can send one or more replication messages 910 to a cluster storage member 904 in a destination cluster 902.

After the cluster storage member 904 in the destination cluster 902 has received and successful processed data changes (1-3) and (4-6), the cluster storage member 904 can send an acknowledgement (ACK) 920 back to the source cluster 903. Also, the system can update the replication record 906 to indicate that data change (6) is the last data change that has been received and successfully processed in the destination cluster 902 for partition P1 in the source cluster 901.

Additionally, while the destination cluster 902 is processing the data changes (7-9), the cluster storage member 903 can send additional replication messages 910 to the cluster storage member 904 in a destination cluster 902. For example, the replication messages 910 can include the data changes (10-12).

Figure 10:
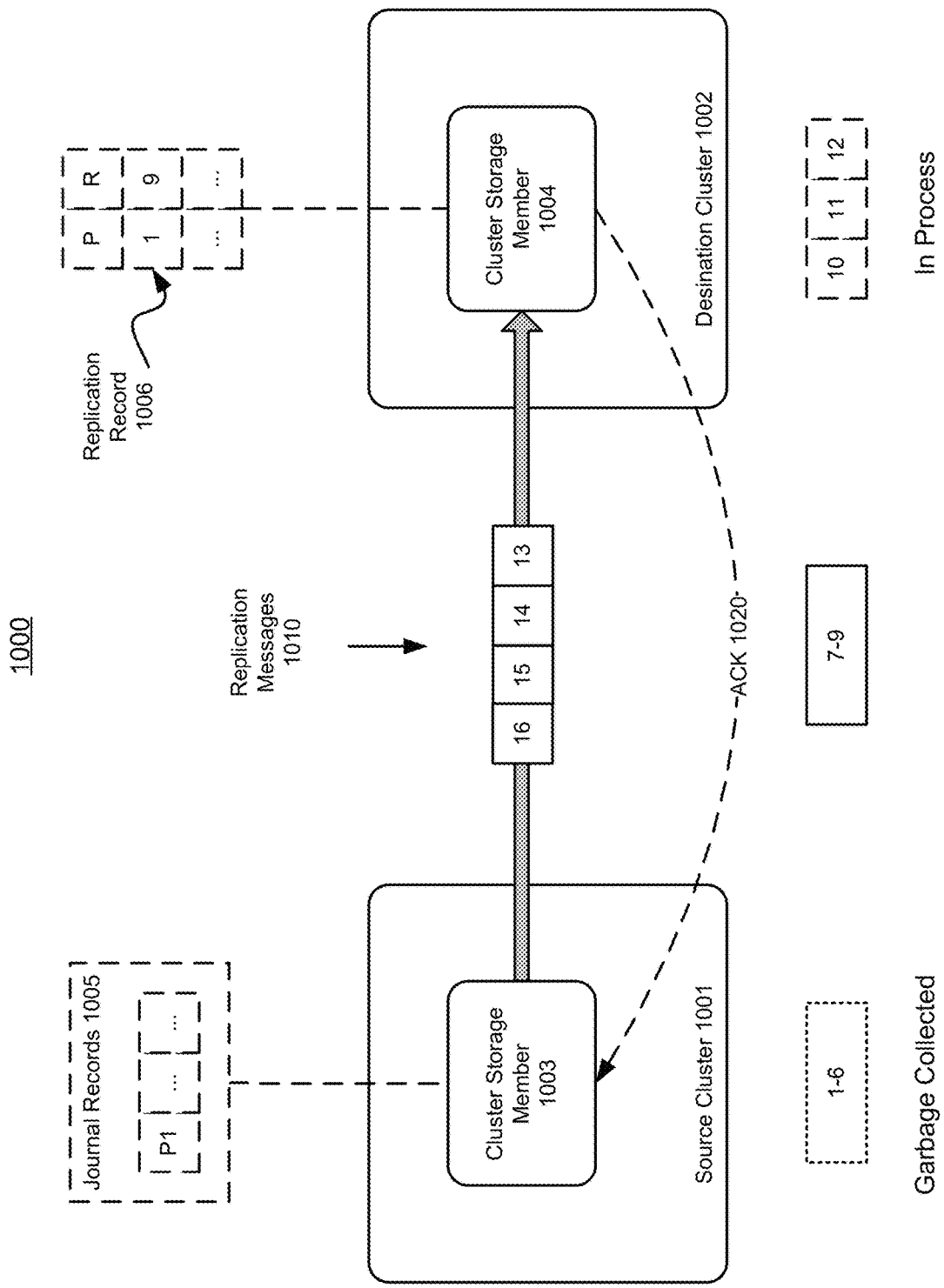
FIG. 10 shows an illustration of further performing asynchronous synchronization between autonomous clusters in a distributed data grid, in accordance with an embodiment of the invention.

FIG. 10 shows an illustration of further performing asynchronous synchronization between autonomous clusters in a distributed data grid, in accordance with an embodiment of the invention. As shown in FIG. 10, a cluster storage member 1003, which owns the partition P1 in a source cluster 1001 in a distributed data grid 1000, can process the journal entries for the partition P1 in the journal record 1005, and can send one or more replication messages 1010 to a cluster storage member 1004 in a destination cluster 1002.

After the cluster storage member 1003 in the source cluster 1001 has received acknowledgement (ACK) 1020, which indicates that the cluster storage member 1004 in the destination cluster 1002 has received and successfully processed the data changes (1-3) and (4-6), the cluster storage member 1003 can perform garbage collection on resource associated with these data changes.

On the other hand, after the cluster storage member 1004 in the destination cluster 1002 has received and successfully processed data changes (7-9), the cluster storage member 1004 can send an acknowledgement (ACK) 1020 back to the cluster storage member 1003 in the source cluster 1001 and can update the replication record 1006, which indicates that data change (9) is the last data change that has been received and successfully processed in the destination cluster 1002 for partition P1 in the source cluster 1001.

In the meantime, the cluster storage member 1004 can continue processing data changes (10-12), while the cluster storage member 1003 can send additional replication messages 1010 to the cluster storage member 1004 in a destination cluster 1002. For example, the replication messages 1010 can include the captured data changes (13-16).

Figure 11:
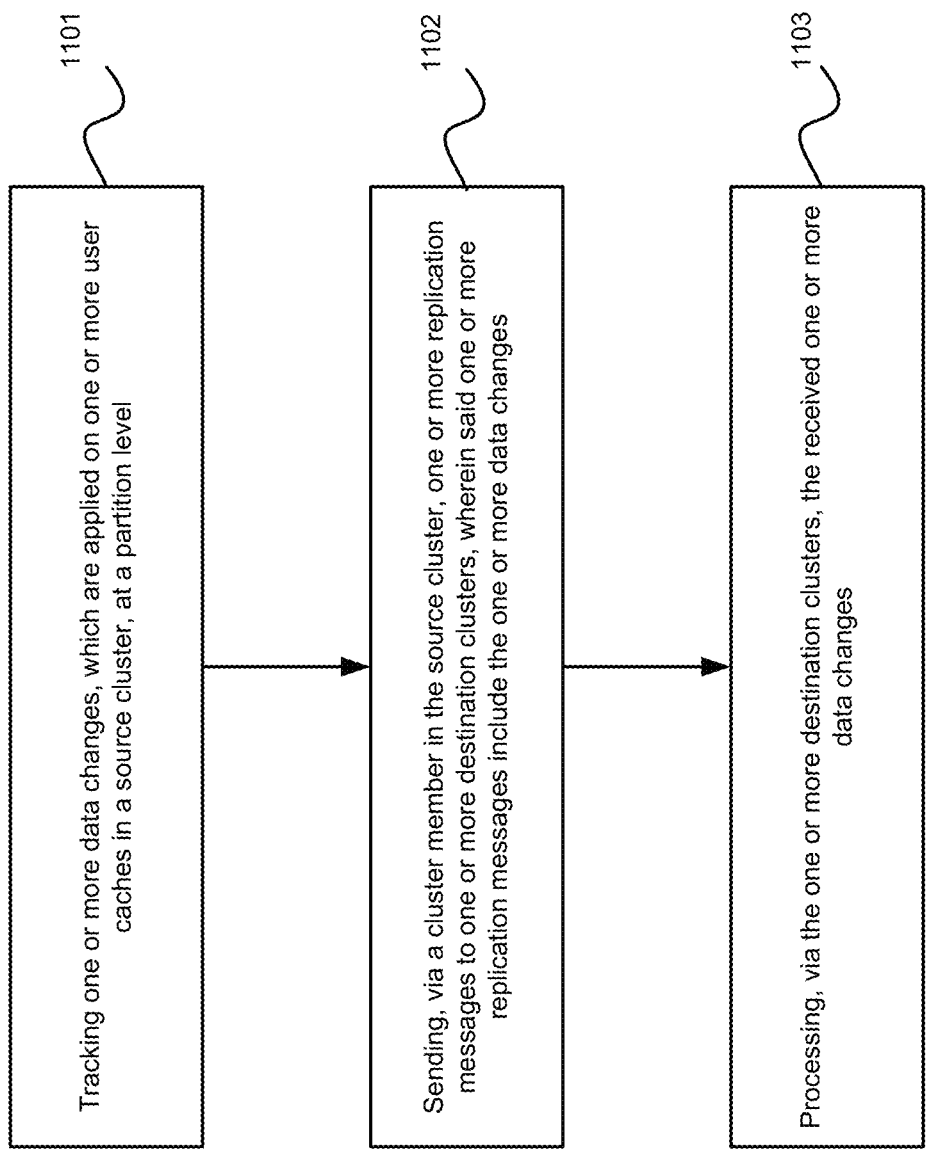
FIG. 11 illustrates an exemplary flow chart for supporting parallel asynchronous synchronization between autonomous clusters in a distributed data grid, in accordance with an embodiment of the invention.

FIG. 11 illustrates an exemplary flow chart for supporting parallel asynchronous synchronization between autonomous clusters in a distributed data grid, in accordance with an embodiment of the invention. As shown in FIG. 11, at step 1101, the system can track one or more data changes, which are applied on one or more user caches in a source cluster, at a partition level. Then, at step 1102, a cluster storage member in the source cluster can send one or more replication messages to one or more destination clusters, wherein said one or more replication messages include the one or more data changes. Furthermore, at step 1103, the one or more destination clusters can process the received one or more data changes.

Failover for Asynchronous Synchronization between Autonomous Clusters

Figure 12:
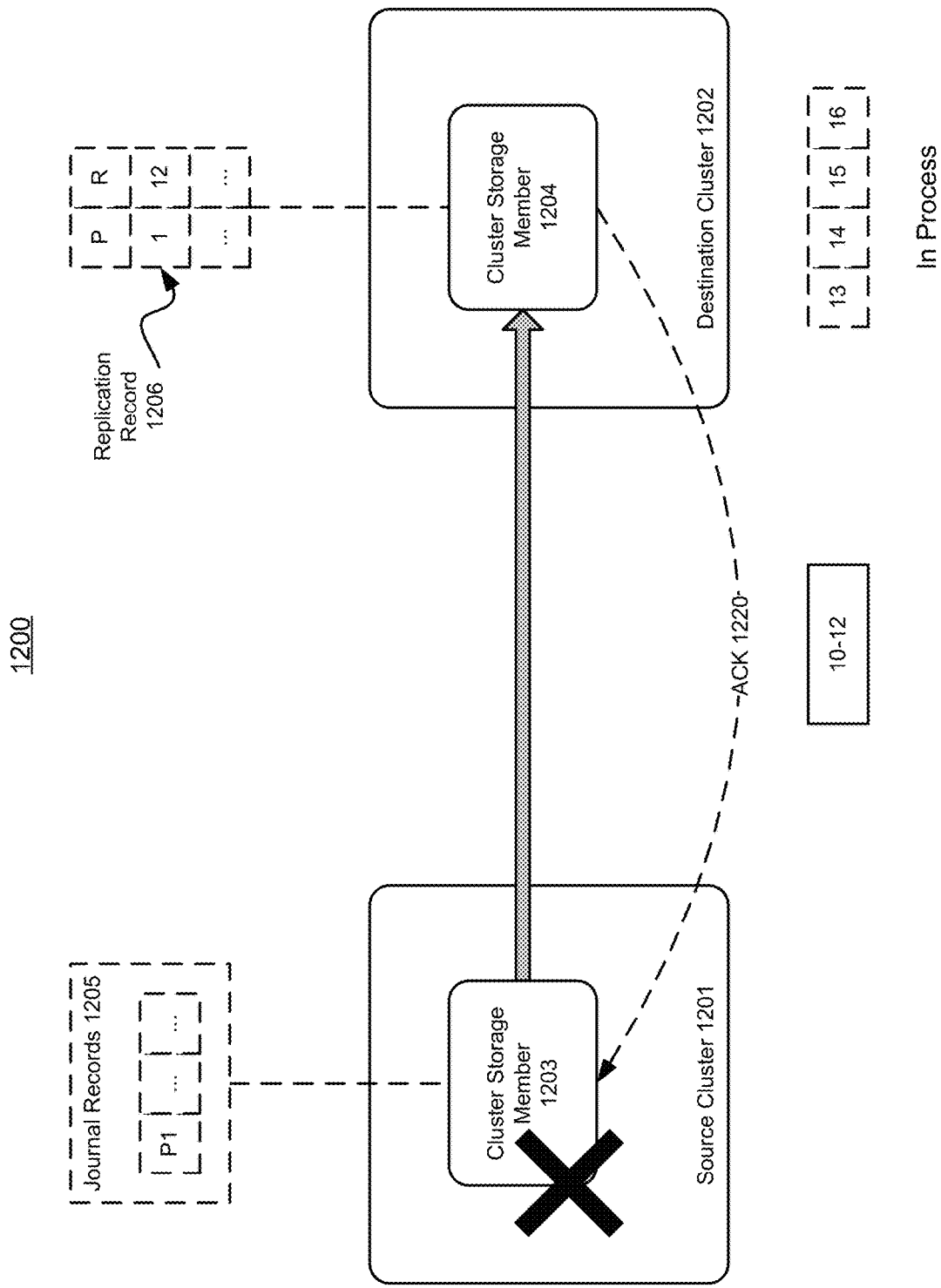
FIG. 12 shows an illustration of a failure on a cluster storage member in a source cluster during synchronization between autonomous clusters in a distributed data grid, in accordance with an embodiment of the invention.

FIG. 12 shows an illustration of a failure on a cluster storage member in a source cluster during synchronization between autonomous clusters in a distributed data grid, in accordance with an embodiment of the invention. As shown in FIG. 12, a cluster storage member 1203, which owns the partition P1 in a source cluster 1201, can process the journal entries for the partition P1 in the journal record 1205, and can send one or more replication messages to a cluster storage member 1204 in a destination cluster 1202.

After the cluster storage member 1204 in the destination cluster 1202 has received and successfully processed data changes (10-12), the cluster storage member 1204 can send an acknowledgement (ACK) 1220 back to the cluster storage member 1203 in the source cluster 1201. Also, the cluster storage member 1204 can update the replication record 1206 to indicate that data change (12) is the last data change on partition P1 in the source cluster 1201 that has been received and successfully processed in the destination cluster 1202.

As shown in FIG. 12, the cluster storage member 1203 in the source cluster 1201 may suffer a failure, and may become unavailable before receiving the acknowledgement (ACK) 1220. Thus, the cluster storage member 1203 in the source cluster 1201 may not have the knowledge that the destination cluster 1202 has already received and successfully processed data changes (10-12) for partition P1 in the source cluster 1201.

In the meantime, the cluster storage member 1204 in the destination cluster 1202 can continue processing the received data changes (13-16), without a need for handling the failure on the cluster storage member 1203 in the source cluster 1201.

Figure 13:
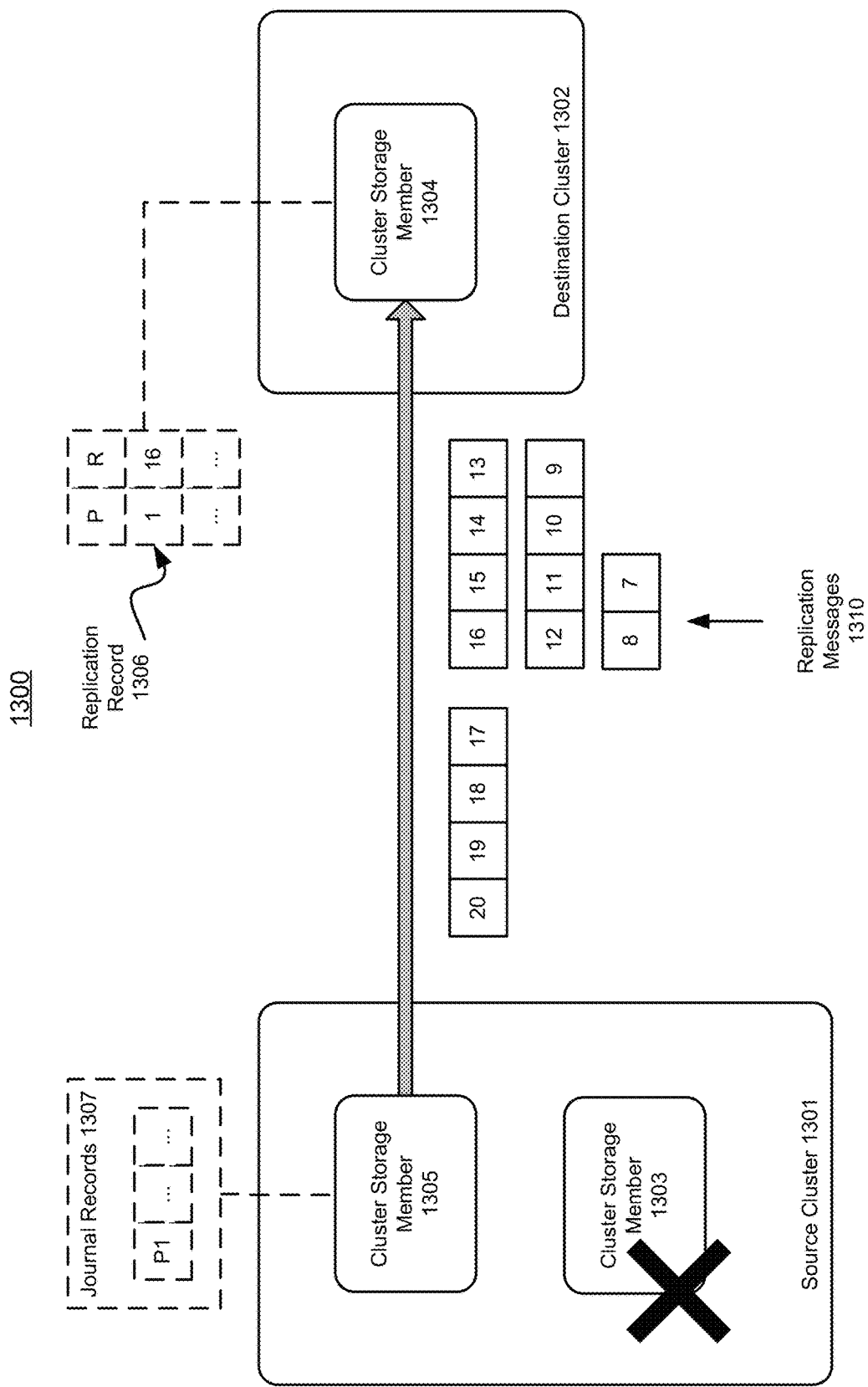
FIG. 13 shows an illustration of performing a failover in a source cluster during an asynchronous synchronization between autonomous clusters in a distributed data grid, in accordance with an embodiment of the invention.

FIG. 13 shows an illustration of performing a failover in a source cluster during an asynchronous synchronization between autonomous clusters in a distributed data grid, in accordance with an embodiment of the invention. As shown in FIG. 13, after a cluster storage member 1303 fails, a cluster storage member 1305 can take over as the owner of the partition P1 in the source cluster 1301 in a distributed data grid 1300.

The cluster storage member 1305, which owns the partition P1 in the source cluster 1301, can process the journal entries for the partition P1 in the journal record 1307, and can send one or more replication messages 1310 to a cluster storage member 1304 in a destination cluster 1302.

Due to the failure of the cluster storage member 1303, the cluster storage member 1305 in the source cluster 1301 may have no knowledge that the cluster storage member 1304 in the destination cluster 1302 has received and successfully processed data changes (7-12) and (17-20).

As shown in FIG. 13, the cluster storage member 1305 in the source cluster 1301 can send all available messages to the cluster storage member 1304. These available replication messages can include the data changes (7-16) and (17-20), the resources for which have not been garbage collected in the source cluster 1301.

On the other hand, since the cluster storage member 1305 in the source cluster 1301 knows that the destination cluster 1302 has received and successfully processed data changes (1-6) and the resouces for data changes (1-6) have been garbage collected, the cluster storage member 1305 in the source cluster 1301 will not send old replication messages, which include data changes (1-6), to the destination cluster 1302.

Furthermore, having successfully processed the data changes (13-16), the cluster storage member 1304 can update the replication record 1306 to indicate that the last data change that has been received and successfully processed for partition P1 in the source cluster 1301 is the data change (16). Additionally, the cluster storage member 1304 may choose not to send an acknowledgement (ACK) back to the source cluster 1303, since the cluster storage member 1303 is not available.

Figure 14:
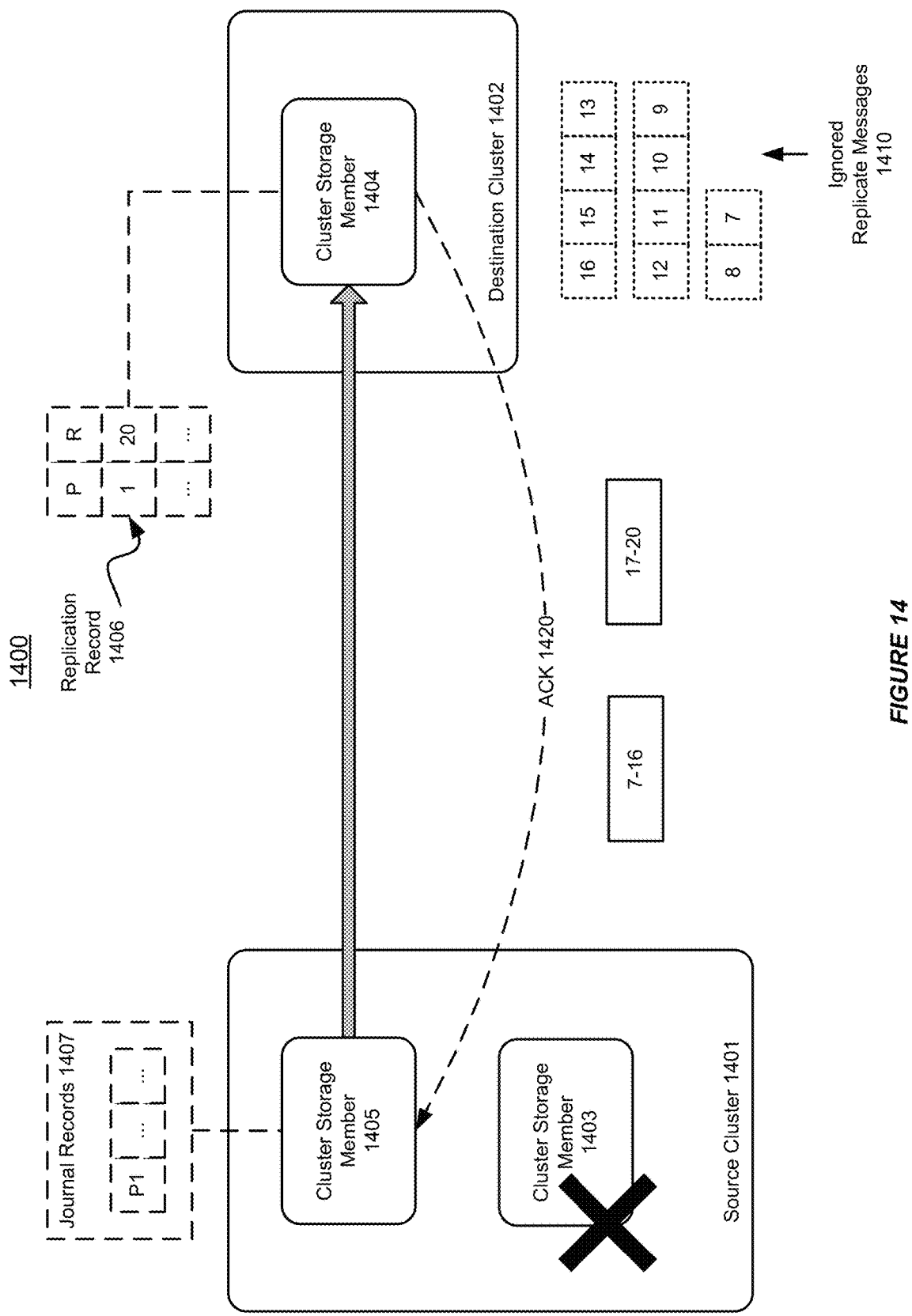
FIG. 14 shows an illustration of supporting asynchronous synchronization between autonomous clusters in a distributed data grid after a failover in a source cluster, in accordance with an embodiment of the invention.

FIG. 14 shows an illustration of supporting asynchronous synchronization between autonomous clusters in a distributed data grid after a failover in a source cluster, in accordance with an embodiment of the invention. As shown in FIG. 14, after a cluster storage member 1403 in a source cluster 1401 in a distributed data grid 1400 fails, a cluster storage member 1405 in the source cluster 1401 can take over as the owner of the partition P1. The cluster storage member 1405 can process the journal entries for the partition P1 in the journal record 1407 in the source cluster 1401.

Furthermore, the cluster storage member 1404 in the destination cluster 1402 can receive various replication messages from the cluster storage member 1405. For example, these replication messages can include data changes (7-16) and (17-20).

Then, the cluster storage member 1404 can check the replication record 1406, which indicates that data change (16) is the last data change that has been received and successfully processed for partition P1 in the source cluster 1401. Thus, the cluster storage member 1404 can ignore the data changes (7-16) 1410, since the cluster storage member 1404 has already been received and successfully processed these data changes. Additionally, the cluster storage member 1404 can send an acknowledgement (ACK) 1420 back to the cluster storage member 1405 in the source cluster 1401 to indicate that the cluster storage member 1404 in the destination cluster 1402 has received and successfully processed the data changes (7-16).

Furthermore, after the cluster storage member 1404 in the destination cluster 1402 has received and successfully processed data changes (17-20), the cluster storage member 1404 can send an acknowledgement (ACK) 1420 back to the cluster storage member 1405 in the source cluster 1401. Also, the cluster storage member 1404 can update the replication record 1406 to indicate that data change (20) is the last data change that has been received and successfully processed in the destination cluster 1402 for partition P1 in the source cluster 1401.

Figure 15:
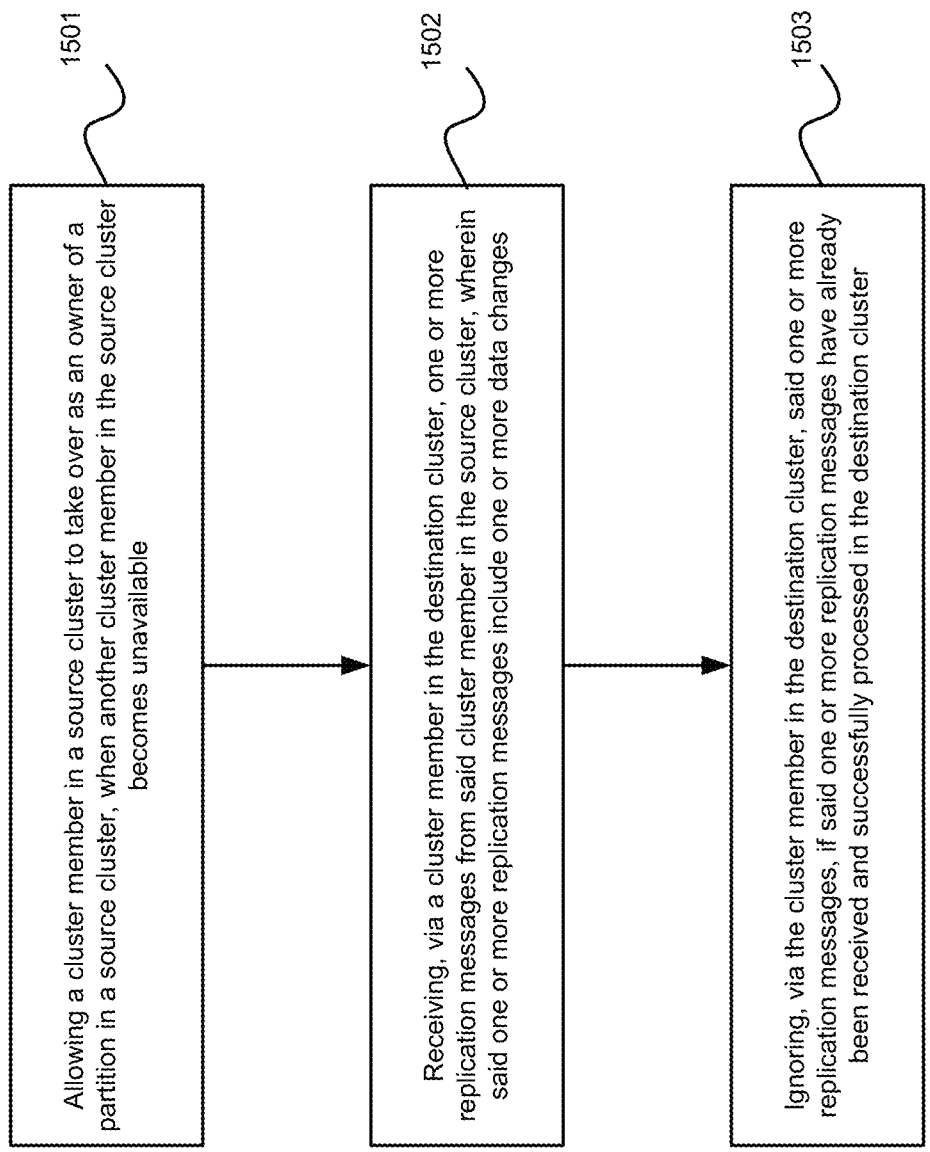
FIG. 15 illustrates an exemplary flow chart for supporting failover for parallel asynchronous synchronization between autonomous clusters in a distributed data grid, in accordance with an embodiment of the invention.

FIG. 15 illustrates an exemplary flow chart for supporting failover for parallel asynchronous synchronization between autonomous clusters in a distributed data grid, in accordance with an embodiment of the invention. As shown in FIG. 15, at step 1501, the system allows a cluster member (such as a cluster storage member) in a source cluster to take over as an owner of a partition in a source cluster, when another cluster member in the source cluster becomes unavailable. Furthermore, at step 1502, a cluster member in the destination cluster can receive one or more replication messages from said cluster member in the source cluster, wherein said one or more replication messages include one or more data changes. Then, at step 1503, the cluster member in the destination cluster can ignore said one or more replication messages, if said one or more replication messages have already been received and successfully processed in the destination cluster.

Resettable Acknowledgements across Autonomous Clusters

In accordance with an embodiment of the invention, unique IDs can be used for passing messages between clusters in the distributed data grid, in order to guarantee that the synchronization operations are idempotent. For example, the unique IDs that are used for message passing may only be monotonically incremented.

Figure 16:
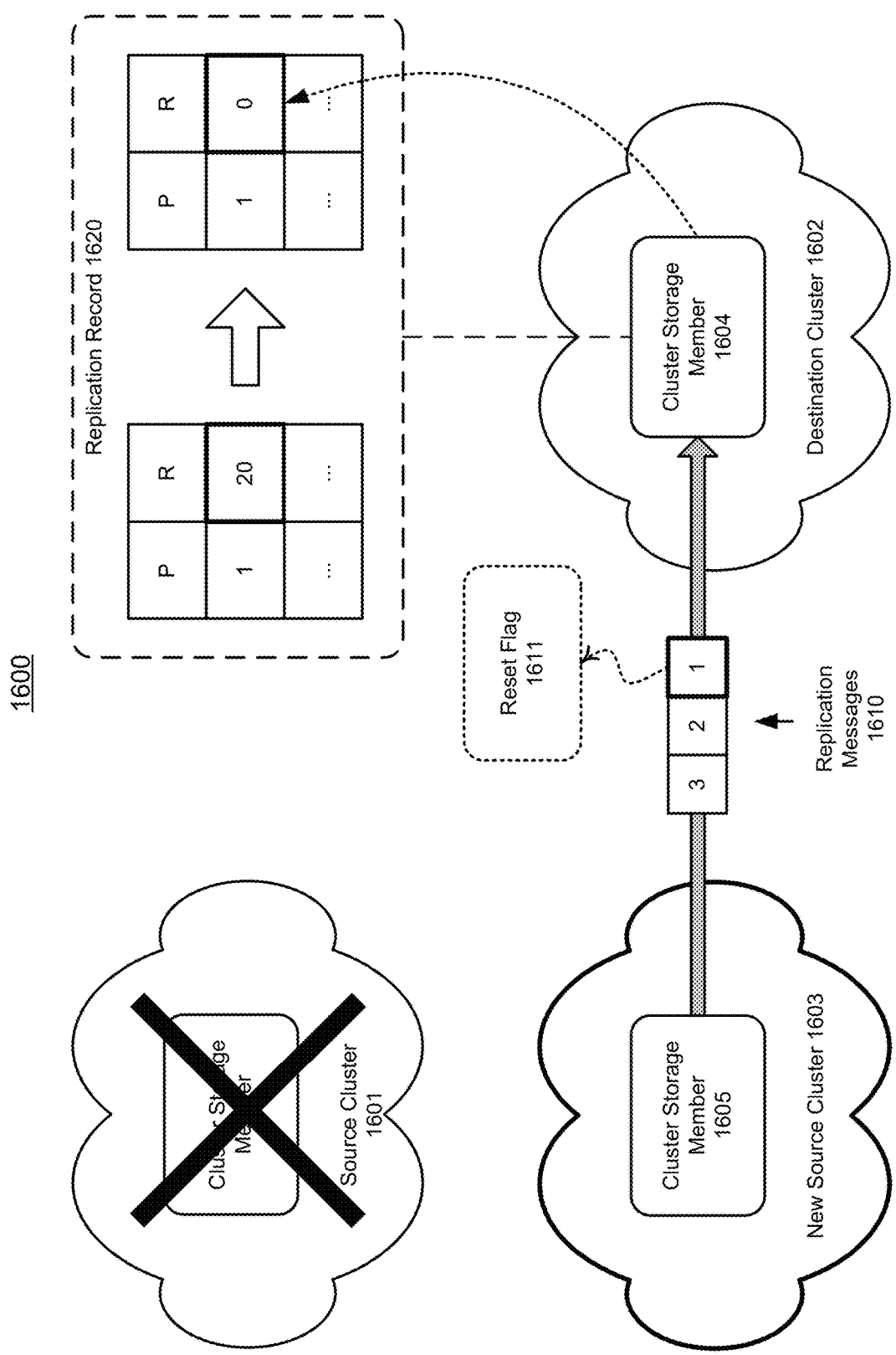
FIG. 16 shows an illustration of supporting resettable acknowledgements across autonomous clusters in a distributed data grid, in accordance with an embodiment of the invention.

FIG. 16 shows an illustration of supporting resettable acknowledgements across autonomous clusters in a distributed data grid, in accordance with an embodiment of the invention. As shown in FIG. 16, a source cluster 1601 in a distributed data grid 1600 may be shut down after sending one or more data changes to a destination cluster 1602.

For example, the replication record 1620 maintained by the cluster storage member 1604 in the destination cluster 1602 can indicate that data change (20) is the last data change on partition P1 that has been received and successfully processed.

As shown in FIG. 3, a new source cluster 1603 can join and takes over. Alternatively, the source cluster 1601 can restart and rejoins as the new source cluster 1603. In either case, a cluster storage member 1605 in the new source cluster 1603 can send one or more replication messages 1610 to the destination cluster 1602, which indicates that the source cluster 1603 is a new cluster. For example, the first message in the replication message 1610 can embed a reset flag 1611.

Furthermore, after the destination cluster 1602 receives the replication messages 1610 from the new source cluster 1603, which indicates that it is a new cluster, the destination cluster 1602 can refresh the replication record 1620. As shown in FIG. 16, the destination cluster 1602 can reset the (high-lightened) entry from (20) to (0), in order to indicate that there are no previous data changes for partition 1.

Thus, the system can use the resettable acknowledgement to preserve idempotent message processing and preserve the transient nature of ID generation during cluster restart.

Additionally, the resettable acknowledgement can be beneficial for avoiding permanent persisting of IDs in a distributed system where some entities may be restarted within a short time period while other entities may run for a long time.

Figure 17:
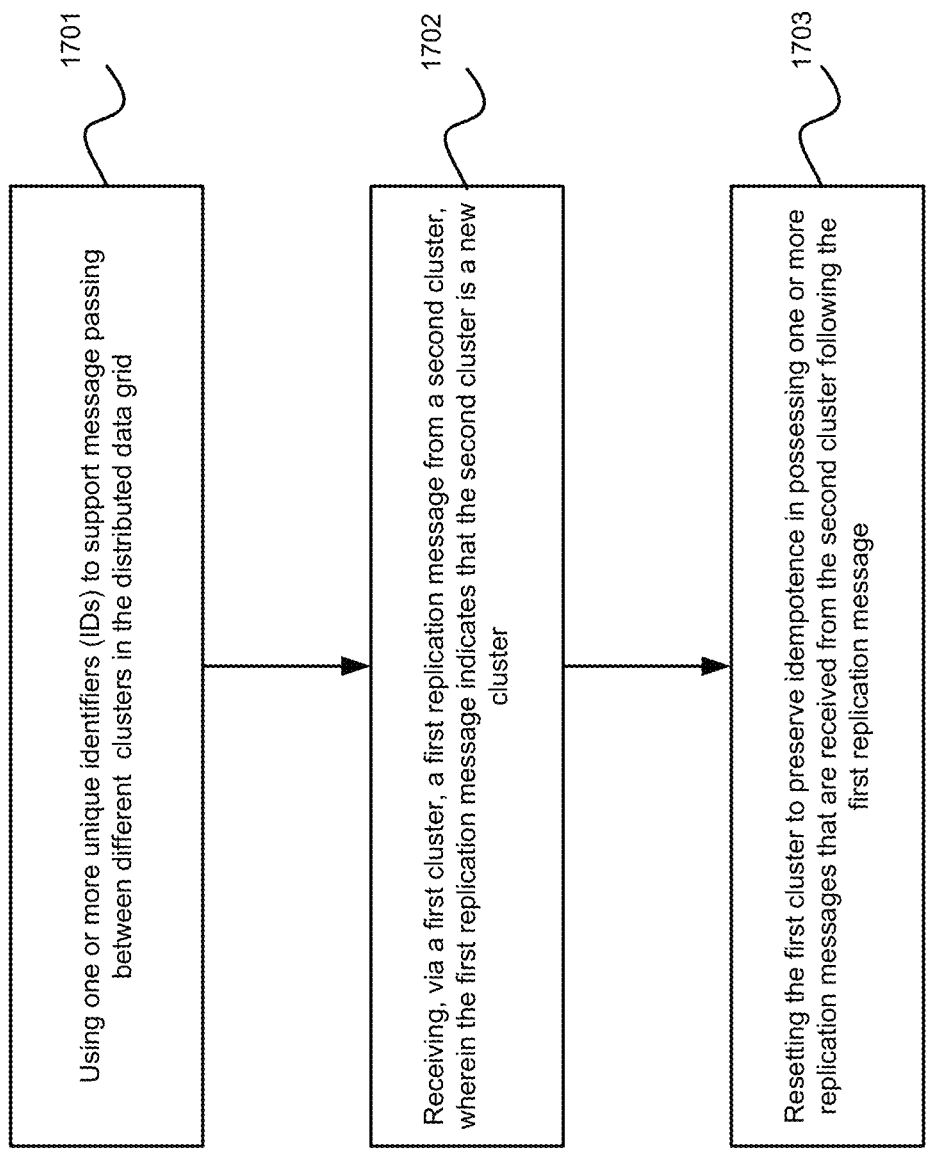
FIG. 17 illustrates an exemplary flow chart for supporting resettable acknowledgements across autonomous clusters in a distributed data grid, in accordance with an embodiment of the invention.

FIG. 17 illustrates an exemplary flow chart for supporting resettable acknowledgements across autonomous clusters in a distributed data grid, in accordance with an embodiment of the invention. As shown in FIG. 17, at step 1701, the system can use one or more unique identifiers (IDs) to support message passing between different clusters in the distributed data grid. Then, at step 1702, a first cluster can receive a first replication message from a second cluster, wherein the first replication message indicates that the second cluster is a new cluster. Furthermore, at step 1703, the system can reset the first cluster to preserve idempotence in possessing one or more replication messages following the first replication message that are received from the second cluster.

Parallel Asynchronous Synchronization Using Finite State Machine

In accordance with an embodiment of the invention, the system can use a (non-blocking) finite state machine for controlling the synchronization process. The finite state machine is a software machine component that, at any point in time, can only be in one of a finite set of possible specific discrete conditions (or states). For example, a cassette player can be represented as a finite state machine with multiple states, such as the Stopped, Playing, Fast Forward, Rewind, and Pause states.

Furthermore, the system can use a model to represent the definition of a finite state machine. For example, this model can include a set of known states, a set of allowable transitions, and a set of actions, A transition is the process of changing from one state to another state in a finite state machine. The transitions for a finite state machine can be pre-defined. For example, only explicitly defined transitions may be allowed in a finite state machine.

Actions represent algorithms and processes to be performed by a finite state machine. Actions may be performed at different stages, such as during a transition, upon entering a state (i.e. transitioning from a previous state), upon leaving a state (i.e. transitioning to a new state). Additionally, actions performed upon entering a state may cause a further transition to occur.

The finite state machine can be a blocking finite state machine, which performs transitions as each event is provided to it by a system, or a non-blocking finite state machine, which performs transitions independently and concurrently to the system that provides it with events.

The non-blocking finite state machine can process internally events, which are queued for later evaluation and possible execution. Furthermore, a non-blocking finite state machine can support different types of events, such as a transition-to event, a delayed transition event, a coalesced event, and a subsequent event.

The transition-to event is a simple event that requests a transition to a particular state. Like other transitions, the transition may occur only if the state machine is in a position to honor the request.

The delayed transition-to event is similar to the transition-to event. Additionally, the delayed transition-to event allows for configurable delayed execution. For example, a delayed transition-to event can define a transition to a known state at some point in time.

The coalesced event is a wrapper around another event. For example, a new event can be coalesced with an existing event, if a same event already exists in the queue. Additionally, the coalesced event can take different parameters, such as FIRST and MOST_RECENT. FIRST indicates that the first submitted event is processed, and MOST_RECENT indicates that the latest submitted event is processed.

The subsequent event wraps another event that will be executed if no other events were submitted before it. These events are submitted to the finite state machine on a timed delay, and allows for other events to pre-empt this event.

Figure 18:
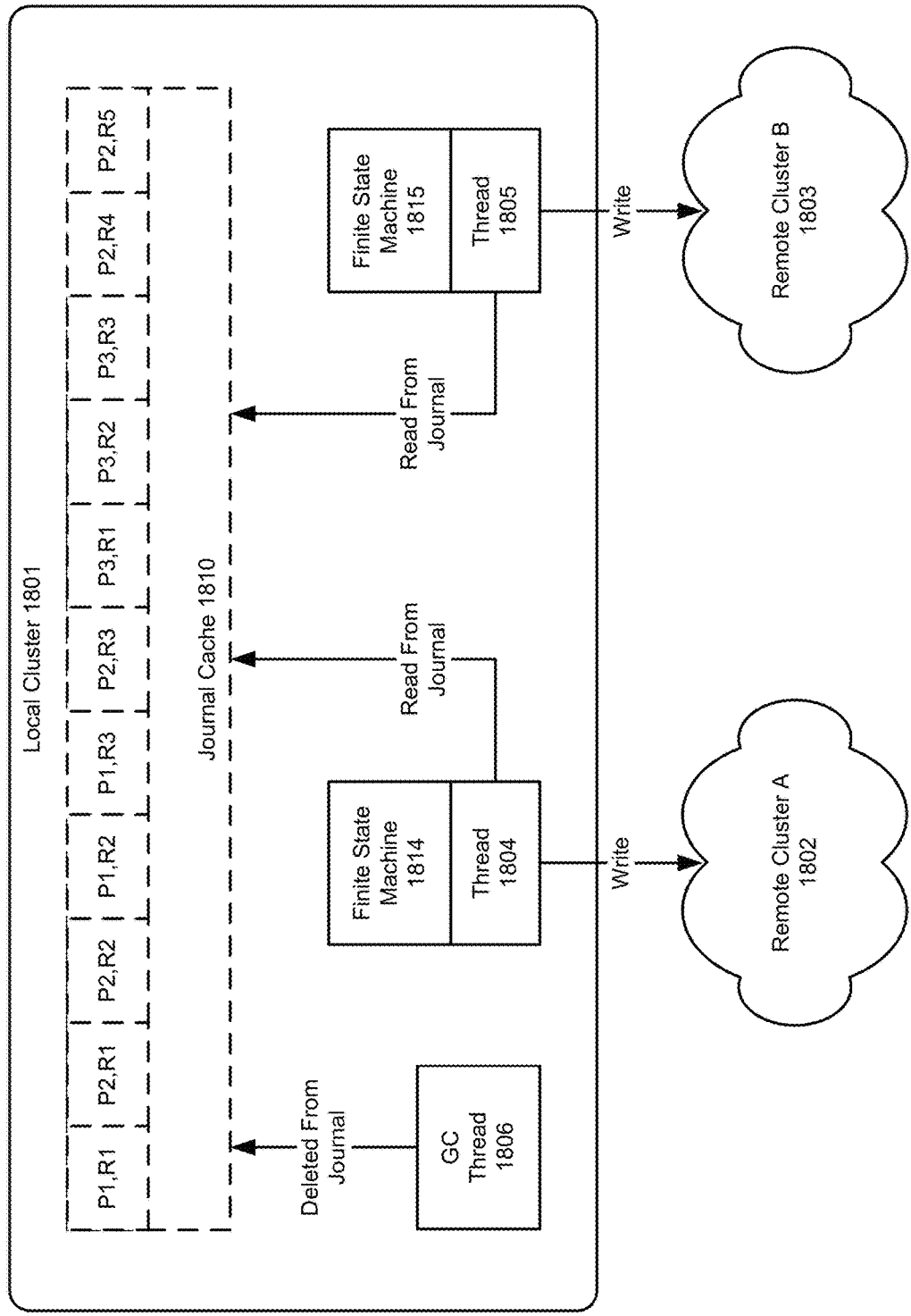
FIG. 18 shows an illustration of using finite state machines for controlling the synchronization between autonomous clusters in a distributed data grid, in accordance with an embodiment of the invention.

FIG. 18 shows an illustration of using finite state machines for controlling the synchronization between autonomous clusters in a distributed data grid, in accordance with an embodiment of the invention. As shown in FIG. 18, a source cluster 1801 in the distributed data grid 1800 can use a journal cache 1810 for storing various user data changes, each of which can be assigned with a unique identifier (ID).

In accordance with an embodiment of the invention, the distributed data grid 1800 supports parallel asynchronous synchronization of the user data changes between the local source cluster 1801 and one or more destination clusters, e.g. the remote (destination) clusters A-B 1802-1803.

As shown in FIG. 18, a thread 1804 can read the user data changes from the journal cache 1810, and can be responsible for writing (or synchronizing) the captured user data changes in the source cluster 1801 to the destination cluster A 1802.

Additionally, a thread 1805 can read the user data changes from the journal cache 1810, and can be responsible for writing (or synchronizing) the captured user data changes in the source cluster 1801 to the destination cluster B 1803.

Furthermore, a garbage collection (GC) thread 1806, can be responsible for delete the user data changes that have already been written, or synchronized, to the different destination clusters A-B 1802-1803.

As shown in FIG. 18, the thread 1804 can be associated with a finite state machine 1814, and the thread 1805 can be associated with a finite state machine 1815. Each of the finite state machines 1814-1805 can be a non-blocking finite state machine, which controls the synchronization process.

Figure 19:
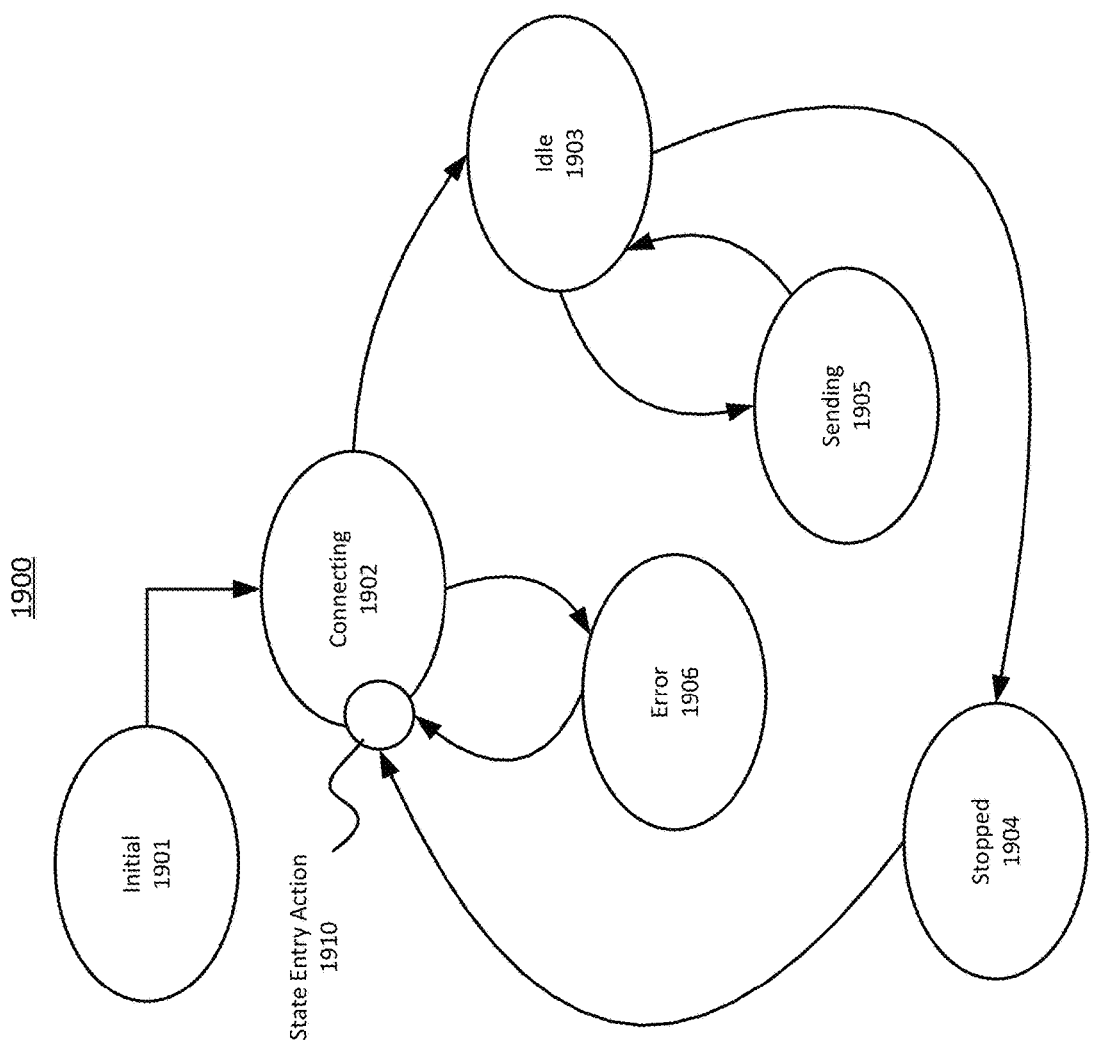
FIG. 19 shows an illustration of various states in a finite state machine, in accordance with an embodiment of the invention.

FIG. 19 shows an illustration of various states in a finite state machine, in accordance with an embodiment of the invention. As shown in FIG. 19, a finite state machine 1900 can involve multiple states, such as an initial state 1901, a connecting state 1902, an idle state 1903, a stopped state 1904, a sending state 1905, and an error state 1906.

As shown in FIG. 19, the finite state machine 1900 allows for a transition from the initial state 1901 to the connecting state 1902, a transition from the connecting state 1902 to the idle state 1903, a transition from the idle state 1903 to the stopped state 1904, and a transition from the stopped state 1904 back to the connecting state 1902. Moreover, the finite state machine 1900 allows for the transitions between the connecting state 1902 and the error state 1906, and the transitions between the idle state 1903 and the sending state 1905.

Additionally, the system can perform a state entry action 1910 before the finite state machine 1900 transits to the connecting state 1902 from either a stopped state 1904 or an error state 1906.

Figure 20:
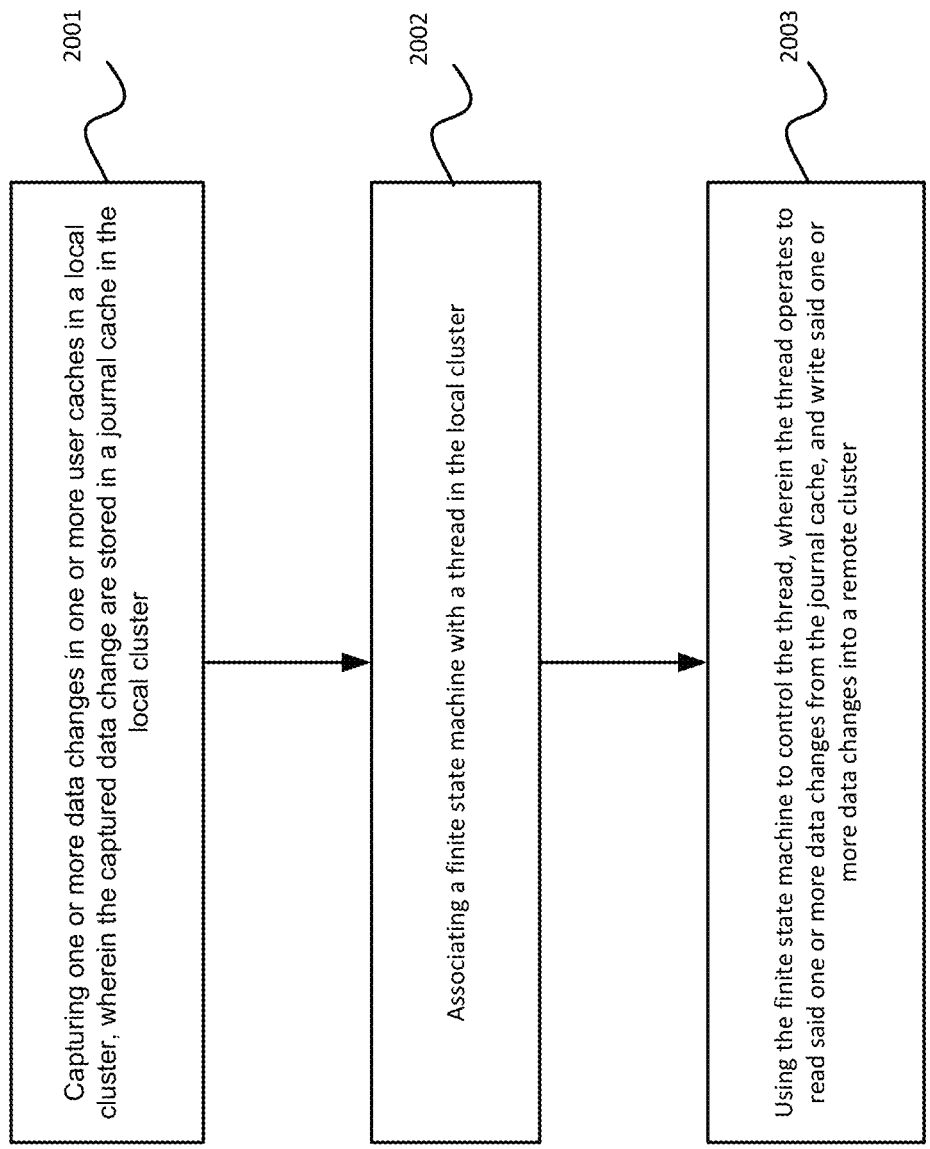
FIG. 20 illustrates an exemplary flow chart for using finite state machines for controlling the synchronization between autonomous clusters in a distributed data grid, in accordance with an embodiment of the invention.

FIG. 20 illustrates an exemplary flow chart for using finite state machines for controlling the synchronization between autonomous clusters in a distributed data grid, in accordance with an embodiment of the invention. As shown in FIG. 20, at step 2001, the system can capture one or more data changes in one or more user caches in a local cluster, wherein the captured data change are stored in a journal cache in the local cluster. Furthermore, at step 2002, the system can associate a finite state machine with a thread in the local cluster. Then, and at step 2003, the system using the finite state machine to control the thread, wherein the thread operates to read said one or more data changes from the journal cache and write said one or more data changes into a remote cluster.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting synchronizing data in a distributed data grid comprising a plurality of autonomous clusters including a first cluster comprising a first plurality of server nodes and a second cluster comprising a second plurality of server nodes, the method comprising:
    operating a journal cache in a memory of a source server node of the second plurality of server nodes in the second cluster, wherein the journal cache stores a plurality of data changes to a data partition in the source server node, which data changes are maintained in the journal cache in an order in which they are made;
    generating a sequence of unique identifiers (IDs) to support data partition replication message passing between the plurality of autonomous clusters in the distributed data grid, wherein a unique identifier is generated for each of the plurality of data changes to the data partition in the source server node and wherein each unique identifier comprises a partition identifier which identifies the data partition and an order identifier which is incremented monotonically for each sequential data change to the data partition;
    receiving, at a destination server node in the first cluster, a plurality of data partition replication messages from the source server node in the second cluster, the plurality of data partition replication messages corresponding to plurality of data changes to the data partition in the source server node;
    maintaining in the destination server node a record identifying, using the order identifiers associated with each of the plurality of data changes, those data partition replication messages received from the source server node and processed in the destination server node;
    receiving, at the destination server node in the first cluster, a first data partition replication message from a new source server node in the second cluster, wherein the first data partition replication message from the new source server node relates to a data change in the data partition, and wherein the first data partition replication message from the new source server node indicates that the new source server node in the second cluster is a new source server node in the second cluster; and
    resetting the record of order identifiers maintained by the destination server node in the first cluster to preserve idempotence in processing one or more subsequent data partition replication messages that are received from the new source server node in the second cluster in response to receiving the first data partition replication message from the new source server node.

2. The method according to claim 1, wherein:
    the data partition replication messages from the source server node in the second cluster are used to provide asynchronous replication of the plurality of data changes to the data partition in the source server node to a data partition on the destination server node in the first cluster.

3. The method according to claim 2, wherein:
    each of the plurality of data partition replication messages contains one of said plurality of data changes.

4. The method according to claim 1, wherein:
    each of the sequence of unique identifiers comprises a key for accessing an associated data change of the plurality of data changes stored in the journal cache of the source server node.

5. The method according to claim 1, further comprising:
    embedding a resetting flag in the first replication message from the replacement source server node.

6. The method according to claim 1, further comprising:
processing, at the destination server node in the first cluster, the plurality of data partition replication messages received from the source server node in the second cluster.

7. The method according to claim 1, further comprising:
processing, at the destination server node in the first cluster, the plurality of data partition replication messages received from the source server node in the second cluster; and
processing, at the destination server node in the first cluster, the first data partition replication messages received from the new source server node in the second cluster.

8. The method according to claim 1, wherein:
said data partition replication message passing between the plurality of autonomous clusters provides for asynchronous synchronization of a partition in the second cluster with a partition in the first cluster.

9. The method according to claim 8, wherein:
the new source server node replaces the source server node when the source server node shuts down.

10. The method according to claim 1, further comprising:
processing the first data partition replication message received from the new source server node and one or more data partition replication messages that follow the first data partition replication message.

11. A system for supporting asynchronous message processing in a distributed data grid, comprising:
one or more microprocessors;
a distributed data grid comprising a plurality of autonomous clusters including a first cluster comprising a first plurality of server nodes, running on the one or more microprocessors and a second cluster comprising a second plurality of server nodes, wherein the distributed data grid operates to perform the steps comprising:
operating a journal cache in a memory of a source server node of the second plurality of server nodes in the second cluster, wherein the journal cache stores a plurality of data changes to a data partition in the source server node, which data changes are maintained in the journal cache in an order in which they are made;
generating a sequence of unique identifiers (IDs) to support data partition replication message passing between the plurality of autonomous clusters in the distributed data grid, wherein a unique identifier is generated for each of the plurality of data changes to the data partition in the source server node and wherein each unique identifier comprises a partition identifier which identifies the data partition and an order identifier which is incremented monotonically for each sequential data change to the data partition;
receiving, at a destination server node in the first cluster, a plurality of data partition replication messages from the source server node in the second cluster, the plurality of data partition replication messages corresponding to plurality of data changes to the data partition in the source server node;
maintaining in the destination server node a record identifying, using the order identifiers associated with each of the plurality of data changes, those data partition replication messages received from the source server node and processed in the destination server node;
receiving, at the destination server node in the first cluster, a first data partition replication message from a new source server node in the second cluster, wherein the first data partition replication message from the new source server node relates to a data change in the data partition, and wherein the first data partition replication message from the new source server node indicates that the new source server node in the second cluster is a new source server node in the second cluster; and
resetting the record of order identifiers maintained by the destination server node in the first cluster to preserve idempotence in processing one or more subsequent data partition replication messages that are received from the new source server node in the second cluster in response to receiving the first data partition replication message from the new source server node.

12. The system according to claim 11, wherein:
the data partition replication messages from the source server node in the second cluster are used to provide asynchronous replication of the plurality of data changes to the data partition in the source server node to a data partition on the destination server node in the first cluster.

13. The system according to claim 11, wherein:
each of the plurality of data partition replication messages contains one of said plurality of data changes.

14. The system according to claim 11, wherein:
each of the sequence of unique identifiers comprises a key for accessing an associated data change of the plurality of data changes stored in the journal cache of the source server node.

15. The system according to claim 11, wherein said steps further comprise:
embedding a resetting flag in the first replication message from the replacement source server node.

16. The system according to claim 11, wherein said steps further comprise:
processing, at the destination server node in the first cluster, the plurality of data partition replication messages received from the source server node in the second cluster.

17. The system according to claim 11, wherein said steps further comprise:
processing, at the destination server node in the first cluster, the plurality of data partition replication messages received from the source server node in the second cluster; and
processing, at the destination server node in the first cluster, the first data partition replication messages received from the new source server node in the second cluster.

18. The system according to claim 11, wherein:
said data partition replication message passing between the plurality of autonomous clusters provides for asynchronous synchronization of a partition in the second cluster with a partition in the first cluster.

19. The system according to claim 11, wherein:
the new source server node replaces the source server node when the source server node shuts down.

20. A non-transitory machine readable storage medium having instructions stored thereon for supporting synchronizing data in a distributed data grid comprising a plurality of autonomous clusters including a first cluster comprising a first plurality of server nodes and a second cluster comprising a second plurality of server nodes, which instructions, when executed, cause the distributed data grid to perform steps comprising:
operating a journal cache in a memory of a source server node of the second plurality of server nodes in the second cluster, wherein the journal cache stores a plurality of data changes to a data partition in the source server node, which data changes are maintained in the journal cache in an order in which they are made;

generating a sequence of unique identifiers (IDs) to support data partition replication message passing between the plurality of autonomous clusters in the distributed data grid, wherein a unique identifier is generated for each of the plurality of data changes to the data partition in the source server node and wherein each unique identifier comprises a partition identifier which identifies the data partition and an order identifier which is incremented monotonically for each sequential data change to the data partition;

receiving, at a destination server node in the first cluster, a plurality of data partition replication messages from the source server node in the second cluster, the plurality of data partition replication messages corresponding to plurality of data changes to the data partition in the source server node;

maintaining in the destination server node a record identifying, using the order identifiers associated with each of the plurality of data changes, those data partition replication messages received from the source server node and processed in the destination server node;

receiving, at the destination server node in the first cluster, a first data partition replication message from a new source server node in the second cluster, wherein the first data partition replication message from the new source server node relates to a data change in the data partition, and wherein the first data partition replication message from the new source server node indicates that the new source server node in the second cluster is a new source server node in the second cluster; and resetting the record of order identifiers maintained by the destination server node in the first cluster to preserve idempotence in processing one or more subsequent data partition replication messages that are received from the new source server node in the second cluster in response to receiving the first data partition replication message from the new source server node.

\* \* \* \* \*

UNITED STATES PATENT AND TRADEMARK OFFICE
CERTIFICATE OF CORRECTION

PATENT NO. : 10,423,643 B2
APPLICATION NO. : 14/467315
DATED : September 24, 2019
INVENTOR(S) : Oliver et al.

Page 1 of 1

It is certified that error appears in the above-identified patent and that said Letters Patent is hereby corrected as shown below:

In the Drawings

On sheet 9 of 20, in FIGURE 9, under Reference Numeral 902, Line 1, delete "Desination" and insert -- Destination --, therefor.

On sheet 10 of 20, in FIGURE 10, under Reference Numeral 1002, Line 1, delete "Desination" and insert -- Destination --, therefor.

In the Specification

In Column 9, Line 51, delete "resouces" and insert -- resources --, therefor.

Signed and Sealed this
Twenty-fourth Day of November, 2020

Andrei Iancu
*Director of the United States Patent and Trademark Office*